(12) United States Patent
Mueggenborg et al.

(10) Patent No.: US 10,419,884 B2
(45) Date of Patent: Sep. 17, 2019

(54) METHODS AND APPARATUS FOR REFERENCE REGENERATION IN REAL TIME LOCATION SYSTEMS

(71) Applicant: Zebra Technologies Corporation, Lincolnshire, IL (US)

(72) Inventors: Alexander Mueggenborg, Arlington, VA (US); Edward A. Richley, Gaithersburg, MD (US); Aitan Ameti, Rockville, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/266,137

(22) Filed: Sep. 15, 2016

(65) Prior Publication Data

US 2018/0077530 A1 Mar. 15, 2018

(51) Int. Cl.
| | | |
|---|---|---|
| H04W 24/00 | (2009.01) | |
| H04W 4/02 | (2018.01) | |
| H04W 56/00 | (2009.01) | |
| H04W 4/80 | (2018.01) | |

(52) U.S. Cl.
CPC ............. *H04W 4/026* (2013.01); *H04W 4/80* (2018.02); *H04W 56/0065* (2013.01)

(58) Field of Classification Search
CPC . H04W 4/026; H04W 4/008; H04W 56/0065; H04L 45/745
USPC .............................................. 455/456.1–457
See application file for complete search history.

(56) References Cited

U.S. PATENT DOCUMENTS

| | | | |
|---|---|---|---|
| 7,190,271 B2 | 3/2007 | Boyd | |
| 2004/0108954 A1* | 6/2004 | Richley | G01S 5/0226 342/387 |
| 2005/0129139 A1* | 6/2005 | Jones | A63B 24/0021 375/295 |
| 2012/0188129 A1* | 7/2012 | Ameti | G01S 5/10 342/451 |
| 2013/0051262 A1 | 2/2013 | Boyd | |
| 2013/0202062 A1 | 8/2013 | Sadr et al. | |
| 2014/0301427 A1 | 10/2014 | Khalaf-Allah | |
| 2014/0361928 A1 | 12/2014 | Hughes et al. | |
| 2015/0148129 A1* | 5/2015 | Austerlade | H04L 43/04 463/31 |
| 2015/0200706 A1 | 7/2015 | Battazzi et al. | |

(Continued)

*Primary Examiner* — Khoi H Tran
*Assistant Examiner* — B M M Hannan

(57) ABSTRACT

Methods and apparatus for reference regeneration in real time location systems are disclosed. An example disclosed method includes obtaining reference phase offsets from a plurality of radio frequency identification (RFID) receivers; transmitting a first synchronization signal via a wireline link to obtain differential wireline coarse sync measurements; determining a residual offset table based at least in part on the differential wireline coarse sync measurements and the reference phase offsets; transmitting a second synchronization signal via the wireline link to obtain revised differential wireline coarse sync measurements; generating revised reference phase offsets by combining the revised differential wireline coarse sync offsets with the residual offset table; and determining a physical location of a RFID tag based at least in part on i) the revised reference phase offsets and ii) RFID receiver clock measurements corresponding to a time-of-arrival of over-the-air data transmitted from the RFID tag.

20 Claims, 11 Drawing Sheets

(56) References Cited

U.S. PATENT DOCUMENTS

| | | |
|---|---|---|
| 2015/0358771 A1 | 12/2015 | Richley et al. |
| 2015/0358938 A1 | 12/2015 | Richley et al. |
| 2016/0044630 A1* | 2/2016 | Markhovsky ....... H04W 64/006 |
| | | 455/456.6 |
| 2016/0097837 A1 | 4/2016 | Richley et al. |
| 2017/0199268 A1* | 7/2017 | Frederick ............. G01S 5/0294 |

* cited by examiner

|      | Rx1 | Rx2 | Rx3 | Rx4 | Rx5 | Rx6 | Rx7 | Rx8 | Rx9 | Rx10 | Rxn |
|------|-----|-----|-----|-----|-----|-----|-----|-----|-----|------|-----|
| Rx1  | ■   | 1,2 | 1,3 | 1,4 | 1,5 | 1,6 | 1,7 | 1,8 | 1,9 | 1,10 | 1,n |
| Rx2  | 2,1 | ■   | 2,3 | 2,4 | 2,5 | 2,6 | 2,7 | 2,8 | 2,9 | 2,10 | 2,n |
| Rx3  | 3,1 | 3,2 | ■   | 3,4 | 3,5 | 3,6 | 3,7 | 3,8 | 3,9 | 3,10 | 3,n |
| Rx4  | 4,1 | 4,2 | 4,3 | ■   | 4,5 | 4,6 | 4,7 | 4,8 | 4,9 | 4,10 | 4,n |
| Rx5  | 5,1 | 5,2 | 5,3 | 5,4 | ■   | 5,6 | 5,7 | 5,8 | 5,9 | 5,10 | 5,n |
| Rx6  | 6,1 | 6,2 | 6,3 | 6,4 | 6,5 | ■   | 6,7 | 6,8 | 6,9 | 6,10 | 6,n |
| Rx7  | 7,1 | 7,2 | 7,3 | 7,4 | 7,5 | 7,6 | ■   | 7,8 | 7,9 | 7,10 | 7,n |
| Rx8  | 8,1 | 8,2 | 8,3 | 8,4 | 8,5 | 8,6 | 8,7 | ■   | 8,9 | 8,10 | 8,n |
| Rx9  | 9,1 | 9,2 | 9,3 | 9,4 | 9,5 | 9,6 | 9,7 | 9,8 | ■   | 9,10 | 9,n |
| Rx10 | 10,1| 10,2| 10,3| 10,4| 10,5| 10,6| 10,7| 10,9| 10,9| ■    | 10,n|
| Rxn  | n,1 | n,2 | n,3 | n,4 | n,5 | n,6 | n,7 | n,8 | n,9 | n,10 | ■   |

FIG. 9

METHODS AND APPARATUS FOR REFERENCE REGENERATION IN REAL TIME LOCATION SYSTEMS

FIELD

Embodiments discussed herein are related to radio frequency locating and, more particularly, to methods and apparatus for reference regeneration in real time location systems (RTLS).

BACKGROUND

A number of challenges exist in configuring and maintaining an RTLS. One such challenge includes recovering from the RTLS system experiencing a power cycle. Such a recovery is inconvenient, time consuming, or, depending on a time at which the recovery is needed and/or environment conditions, impractical.

BRIEF DESCRIPTION OF THE SEVERAL VIEWS OF THE DRAWINGS

FIG. 9 is a table including example values for first reference phase offsets.

Figure 1:
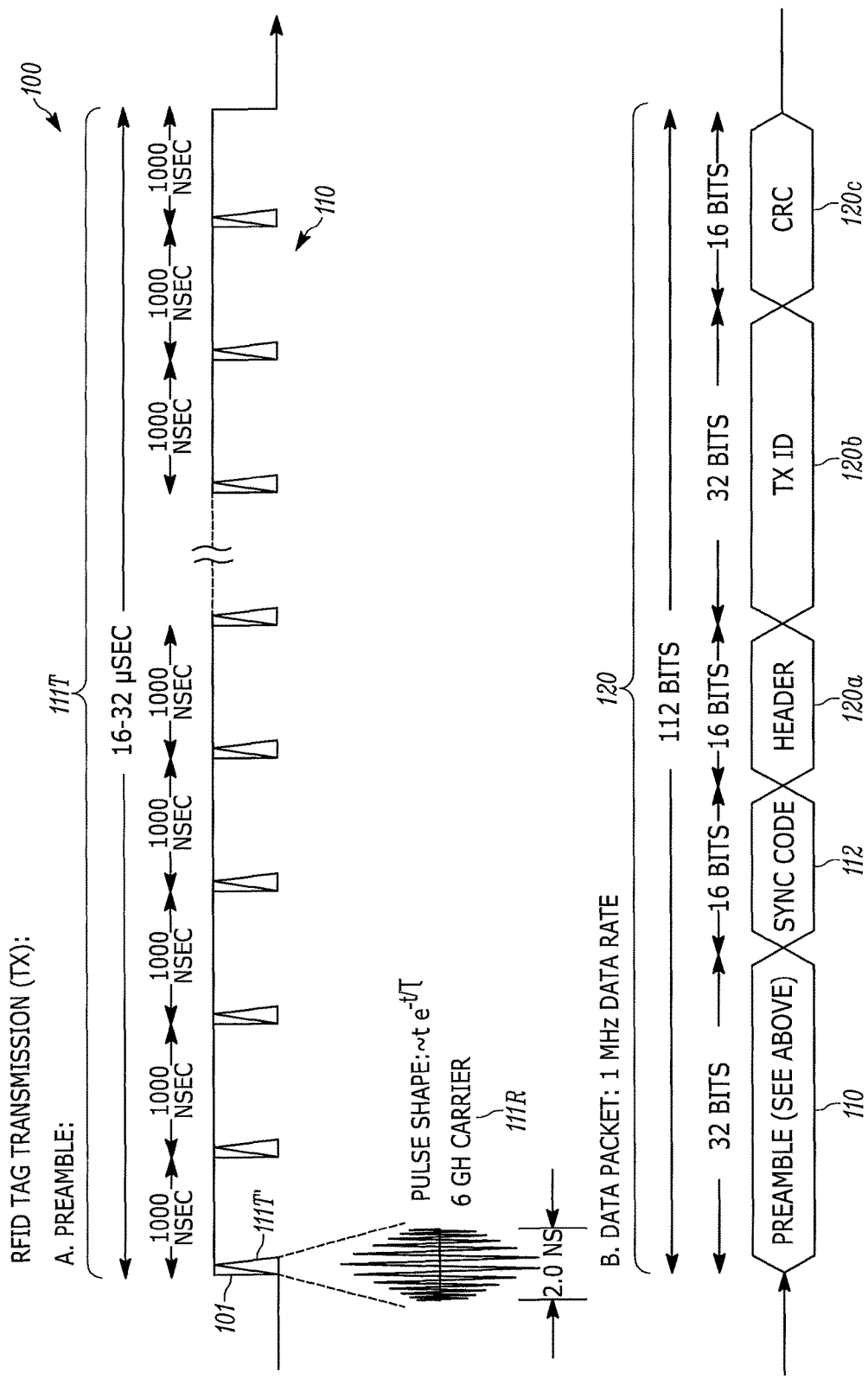
FIG. 1 is an example timing diagram for an RTLS tag transmission (TX) in an example high-resolution TOA determination system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of teachings of this disclosure.

Components of the apparatus and operations of the methods have been represented where appropriate by conventional symbols in the drawings, showing only those specific details that are pertinent to understanding the teachings of this disclosure so as not to obscure the disclosure with details that will be readily apparent to those of ordinary skill in the art having the benefit of the description herein.

DETAILED DESCRIPTION

In some RTLS systems, receivers deployed throughout a monitored area receive tag blink data (e.g., ultra-wideband (UWB) transmissions) from one or more tags. Some of the tags are carried by objects to be located. Some of the tags are reference tags that the RTLS utilizes to, among other purposes, determine reference phase offsets. As used herein, a reference phase offset indicates the difference in timestamp values between a particular pair of receivers at all points in time. The reference phase offset may be determined based on each receiver's counter value when a reference tag blink data transmission is received from one or more reference tag blink data transmissions by the respective receiver. That is, a reference phase offset is a measure of a relative counter value difference between two internal receiver clocks. The reference tag position is known, and so propagation time can be determined and subtracted from time measurements to determine actual counter offsets (e.g., relative counts at any time). The reference phase offset indicates, in some examples, a mismatch of counter values between pairs of receivers, and the reference phase offset is applied to the receiver's counter values to align for this mismatch. In some examples, the reference phase offsets are recorded in a data structure, such as a reference phase offset table. Notably, the reference phase offsets are used by the RTLS to calculate the locations of the tags carried by the objects to be located.

Reference, as used herein, may relate to the generation and/or use of one or more reference phase offset calculations or reference offset data. The process of generating the reference phase offsets is challenging. Reference location transmissions rely on line of sight with receivers and are susceptible to radio frequency (RF) interference and physical blockage. Noisy environment (e.g., "game day" at a sporting event at which the RTLS is deployed) may prevent the RTLS from establishing or otherwise maintaining connection or otherwise receive a reference signal to establish reference during the event due to high instances of RF interference and/or physical blocking of the reference signal. These interferences may drastically reduce accuracy of the location calculations or temporarily disable the RTLS.

As such, generation or establishment of the reference phase offsets is often performed at a time corresponding to desirable conditions. For example, when the RTLS is deployed at a sporting arena (e.g., a football stadium), a reference phase offsets are generated on a non-game day when the sporting arena is not being otherwise utilized and the values of the reference phase offsets are stored in a reference phase offset table. As established in the desirable conditions, the values of the reference phase offset table are subsequently used by the RTLS during "game day." Thus, the challenging and potentially less accurate process of generating reference phase offsets in undesirable conditions (e.g., during "game day") can be avoided.

However, during certain events, such as a power cycling of one or more of the receivers, the reference phase offsets may be disturbed from the previously established state, which may be referred to as an initial state. That is, once all the receivers in the system are operating, and the relative counter offsets have been determined by analysis of reference tag signals, any disturbance in one or more of the receivers may cause the reference phase offsets to have different values. This is the case even though the internal clocks of the receivers maintain synchronization. In known systems, the reference phase offsets would need to be regenerated using the same approach as the initial reference generation process. That is, reference tag blink data would need to be obtained and the calculations of the reference phase offsets would again be based on collected reference tag blink data. As mentioned above, such a process is challenging and, depending on conditions, may lead to less accurate data.

Example methods and apparatus disclosed herein avoid having to regenerate reference phase offsets using newly acquired reference tag blink data when, for example, one or more components of the RTLS undergo a power cycle, thereby invalidating an established reference phase offset table (i.e., a table generated based on reference tag blink data under desirable conditions). Instead, while the established reference phase offset table is valid, example methods and apparatus disclosed herein generate a residual reference table based on the established, valid reference phase offset table and timing measurements taken from a signal propagated down a chain of receivers (e.g., via cabling that couples the receivers along the chain). For example, a value of the residual reference table corresponding to a receiver pair is determined by calculating a difference between the corresponding value of the established, valid reference phase offset table and a corresponding timing measurement associated with the propagated signal. In particular, the timing measurements associated with the propagated signal are based on timestamps corresponding to replies received from the difference receivers in response to the propagated signal.

The residual reference table generated by examples disclosed herein is subsequently usable to re-establish a valid reference phase offset table in the event that the previously established reference phase offset set becomes invalid (e.g., due to a power cycle or other type of reset). In particular, examples disclosed herein recognize that the delay of the propagated signal through each receiver is deterministic (e.g., known or knowable) and, thus, a relative timing relationship between the pairs of receivers can be applied to the reference phase offset table. Thus, should the established reference phase offset values become invalid (e.g., due to a power cycle), examples disclosed herein propagate another signal down the chain of receivers and obtain new relative timing relationships between the pairs of receivers based on timestamps of the replies to the propagated signal. Examples disclosed herein combine the values of the residual reference table and the newly obtained relative timing relationships obtained via the second propagated signal to determine the new reference phase offset table. Notably, the new reference phase offset table is generated without having to re-obtain reference tag blink data.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Example Target Location System

FIG. 1 shows an example timing diagram 100 for an RTLS tag transmission (TX) in a high-resolution TOA determination system. The example timing diagram 100 comprises a TX clock 101, a preamble 110, and a data packet 120, which as presented in FIG. 1, includes the preamble 110 as a subset of the data packet 120. The preamble 110 is comprised of a transmit (TX) series of pulses 111T, wherein the TX series of pulses 111T are equally spaced in time, in accordance with a period associated with the TX clock 101. In some examples, the period associated with the TX clock is approximately one (1) microsecond (µsec), whereby the TX clock 101 operates at a frequency of one (1) megahertz (MHz).

Each individual TX pulse 111T' in the TX series of pulses 111T is identical. In some examples, the TX pulse 111T' comprises a six (6) GHz carrier wave modulated by a two (2) nanosecond (nsec) pulse, or rectangle function (rect). In some examples, the TX pulse 111T' is additionally shaped at a receiver by a transmit and receive antenna and any electronics associated with an amplification or pre-amplification of the TX pulse 111T', in conjunction with the high-resolution TOA determination system. In some examples, the TX pulse 111T' shape at the receiver, denoted RX pulse 111R', may be consistent with a function $\sim t\, e^{-t/\tau}$. The TX series of pulses 111T is used to provide for an iterative windowing function, an adjustable coarse timing window 200, described in FIG. 2.

The example data packet 120 of FIG. 1 comprises at least the following data words: the aforementioned preamble 110, a sync code 112, a header 120A, a transmit identification (TX ID) 120B, and a CRC word 120C. The sync code 112 represents a known sequence of 1's and 0's. In other examples, the 1's and 0's may be distributed in other ways. In some examples, the sync code 112 is sixteen (16) bits long. In the illustrated example, the sync code 112 consists primarily of 1's, which represent the TX pulses 111T', rather than 0's, which represent 'blanks,' or no pulse. The sync code 112 is used to provide for a registration code 350 in response to each of the TX pulses 211T' associated with the sync code 212, whereby the registration code 350 provides for a record of a detection of the sync code in a receiver (RX) fine timing window function 300, which is described below in connection with FIG. 3.

The data packet 120 is transmitted by the RTLS tag transmitter, in some examples, continually and periodically. In some examples, the transmission of the data packet 120 is initiated immediately at the end of the one (1) µsec period associated with a final transmit bit, which in this example is the CRC 120C least significant bit. In some examples, a waiting period between successive transmissions is established.

In some examples, the data packet 120 is one-hundred twelve (112) bits long, wherein the bit distribution may be as follows: the preamble 110 (e.g., thirty-two (32) bits), the sync code 112 (e.g., sixteen (16) bits), the header 120A (e.g., sixteen (16) bits), the TX ID 120B (e.g., thirty-two (32) bits), and the CRC 120C (e.g., sixteen (16) bits). In some examples, a transmission time associated with the data packet 220 and the aforementioned one (1) MHz data rate is one-hundred twelve (112) μsec. In this example, when coupled with a thirty-two (32) μsec preamble 210, a data RTLS tag transmission time may be calculated to be one-hundred forty-four (144) μsec per transmission, or one-hundred forty-four (144) μsec/TX. With a data rate equal to 144 μsec/TX, as described in this example, it may be possible to accommodate up to ten-thousand (10,000) transmissions (e.g., single transmissions associated with up to ten-thousand 10,000 RTLS tags in the high-resolution TOA determination system) in just over one (1) second.

In other examples, the data packet 120 may consist of a plurality of data long words 120', immediately following the TX ID 120B and preceding the CRC 120C, resulting in a longer data packet 120. In some examples, the plurality of data long words 220B' are each thirty-two (22) bits long.

In some examples, the plurality of data long words 120B' may include one or more of a temperature, an acceleration, and an attitude of rotational displacement. In some examples, the plurality of data long words 120B' may include a 'Query' command to the receiver, wherein the RTLS tag transmitter, in this example, is equipped with a one-hundred twenty-five (125) kHz receiver and associated firmware to decode a response.

Figure 2:
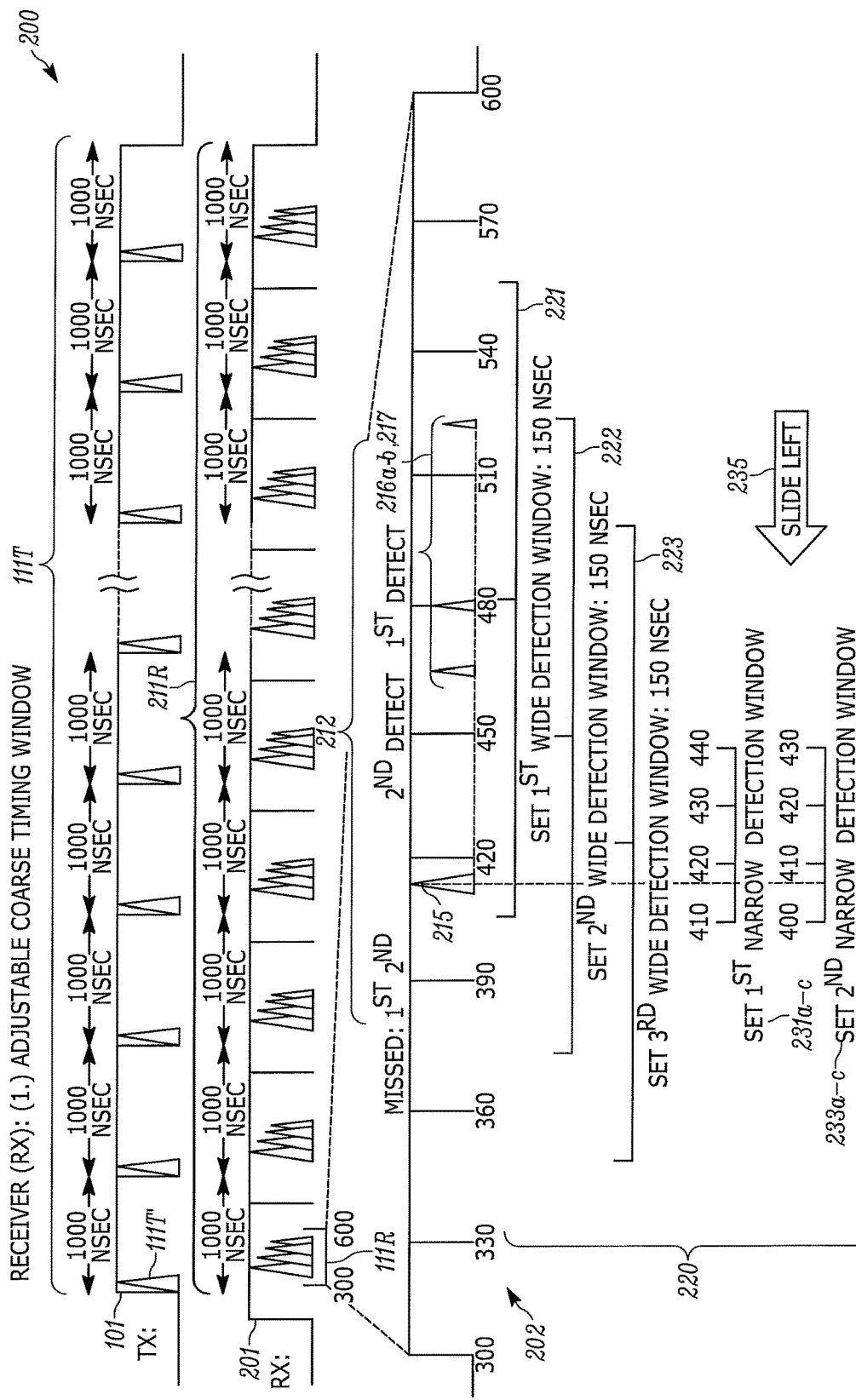
FIG. 2 is an example timing diagram for a receiver (RX) adjustable coarse timing window function.

FIG. 2 depicts an example timing diagram for a receiver (RX) adjustable coarse timing window function 200. The example timing diagram of FIG. 2 comprises the TX clock 101 and the TX series of pulses 111T associated with the RTLS tag transmission (TX) 100, presented in FIG. 1, and an RX clock 201 and an RX clock timing diagram 202. A received (RX) pulse train 211R is comprised of a series of the RX pulses 111R, corresponds to the TX series of pulses 111T, and is synchronized to the RX clock 201, which is resident at an example receiver in the receiver grid. An RX pulse signature 212, representing an earliest pulse 215 and a series of echoes 216a-b and possible noise pulses 217, as shown in FIG. 2, is associated with the RX clock timing diagram 202, and is also associated with the corresponding TX pulse 111T'.

In the example presented in FIG. 2, the one (1) MHz TX clock 101, as presented in FIG. 1, and the associated one (1) MHz RX clock 201 may be out of phase with respect each other. The relative stability of the respective TX clock 101 and RX clock 201 frequencies for the short duration TX transmit time allows for an iterative, adaptive adjustment of the RX clock 201 phase with respect to the TX clock 101 phase, effecting a change in the receiver RX adjustable coarse timing window function 200.

The example RX adjustable coarse timing window function 200 of FIG. 2, is comprised of a series of detection windows 220, including wide detection windows 221-223 and narrow detection windows 231-233, and an associated set of functions to adaptively position the series of wide and narrow detection windows 220 to center the RX pulse 111R in the corresponding window. In some embodiments, as in the present example shown in FIG. 2, there are ten (10) wide detection windows. In the example of FIG. 2, there are three (3) wide detection windows 221-223 and two (2) narrow detection windows 231 and 233. For notation convenience, the last window in the series of wide and narrow detection windows 220 is called a final detection window.

In the example of FIG. 2, a first detection window 221 may be centered at four-hundred eighty (480) nsec, for example, with a width of one-hundred fifty (150) nsec. The center of the first detection window is a function of a first registered detection, wherein the present example registers a first registered detection at a second echo 216b of the RX pulse 111R. In some examples, the width of the first wide detection window 221 is a function of an expected distance from the RTLS tag transmitter to the receiver, the distance-to-time relationship given by the RF propagation time—the speed of light in a vacuum (c)—approximately one (1) foot per nsec.

The first wide detection window 221 may be adaptively updated by a second wide detection window 222 as provided by evidence of a second registered detection, wherein the present example registers a second registered detection at a first echo 216a of the RX pulse 111R. In the example of FIG. 2, the second wide detection window 222 is centered at approximately four-hundred sixty (460) nsec with a width of one-hundred fifty (150) nsec. Similarly, the second wide detection window 222 may be adaptively updated by a third wide detection window 223 as provided by evidence of a third registered detection, wherein the present example registers a third registered detection at an earliest pulse 215 of the RX pulse 111R. In the example of FIG. 2, the third wide detection window 223 is centered at approximately four-hundred fifteen (415) nsec with a width of one-hundred fifty (150) nsec.

The series of wide detection windows 221-223 continue to be adaptively updated by the registered detections of RX pulses 111R that comprise the RX pulse train 211R corresponding to the TX series of pulses 111T in the preamble 110. In some examples, a final wide detection window is declared after a detection of ten (10) RX pulses 111R. At which point a final wide detection window is determined, the registered detections for the series of wide detection windows 221-223 ends, and the series of narrow detection windows 231 and 233 is implemented.

In the illustrated example, a first narrow detection window 231 is centered at the center of wide detection window 223. The width of the first narrow detection window 231 is thirty (30) nsec, in some examples. Note that, as the example of FIG. 2 demonstrates, a timing shift may result with the registered detection of the RX pulse 111R associated with the final wide detection window 223. The placement of the first narrow detection window 231, which is centered at four-hundred twenty-five (425) nsec, graphically represents such shift, as the earliest pulse 215 associated with the RX pulse 111R appears to be registered along the RX clock timing diagram 202 closer to four-hundred fifteen (415) nsec.

Each of the series of narrow detection windows 231 and 233 is comprised of three (3), ten (10) nsec, disjoint timing windows 231a-c, and 233a-c. Detections for the RX pulses 111R that comprise the RX pulse train 211R are registered in parallel in each of the three disjoint timing windows 231a-c, for example, to determine to which of the three disjoint timing windows 231a-c the detection should be assigned. The purpose of the series of narrow detection windows 231 and 233 is to ensure that the final detection associated with the final RX pulse 111R in the RX pulse train 211R is registered in a final center disjoint timing window 233b associated with the final detection window 233. A slide narrow window function 235 to slide the series of narrow detection windows 231 and 233 left and right in ten (10) nsec increments, for example, is provided as a method to achieve the aforementioned requirement, and as such the final detection associated with the final RX pulse 111R in the RX pulse train 211R is registered in the center of the final detection window 233.

The example RX adjustable coarse timing window function 200, shown in FIG. 2, may be implemented as a first feedback loop, wherein a pulse detector resides in the forward feed and the slide window function 235 may comprise the feedback. The pulse detector may determine whether or not a pulse detection is registered in the currently prescribed disjoint timing windows 231a-c, for example, for any of the series of narrow detection windows 231 and 233. As a function of the detections registered in the currently prescribed disjoint timing windows 231a-c, for example, a feedback function may determine which direction a shift is to be made, and in some examples, what is the magnitude of the prescribed shift, if different from a default shift value of ten (10) nsec, for example.

As previously stated, the default shift magnitude is equal to the shift magnitude presented in the example given in FIG. 2, that of ten (10) nsec, for example. A minimum shift magnitude may also be given (e.g., ten (10) nsec). Larger shift magnitudes may be incorporated, dependent on the detection algorithm. In some examples, a detection algorithm that may determine multiple echoes 216a-b as registered in a relatively wide detection window may include logic to 'skip' left over several reflections at once to expedite the capture of the earliest pulse 215, the line-of-sight channel. In such instances, a registration of multiple echoes 216a-b in the relatively wide detection window may be determined by the relative amplitude of the registered detections.

Multiple echoes 216a-b or reflections may be registered in the same detection window in, for example, reflective environments, such as environments surrounded by conductors. By contrast, it is unlikely that both the earliest pulse 215, the line-of-sight channel, and an echo 216a-b—or reflection—might arrive within the limits of the same wide detection window 221-223, as the time difference between the earliest pulse 215, the line-of-sight channel, and the echo 216a-b, the reflection, may be on the order of tens of feet, or greater than one-hundred fifty (150) nsec difference in TOA, the width of the wide detection window 221-223 in this example.

Further, the detectors themselves may comprise several functions that may affect an improved detection resolution. For example, the detectors may be assigned a detection level or a threshold level that may determine whether the magnitude of the earliest pulse 215, one or more of the echoes 216a-b, or a noise pulse 217 is in fact a signal, or just a low-level background noise interference. Alternatively or additionally, for example, a signal-to-noise (SNR) level may be monitored dynamically, and the detection threshold level adjusted accordingly. In a further advancement, a relative strength of the signal may be monitored dynamically, whereby the strength of the signal, in conjunction with a TOA determination associated with the signal, may comprise two inputs to an automatic gain control (AGC) for either a pre-amplification or an amplification of the signal.

Figure 3:
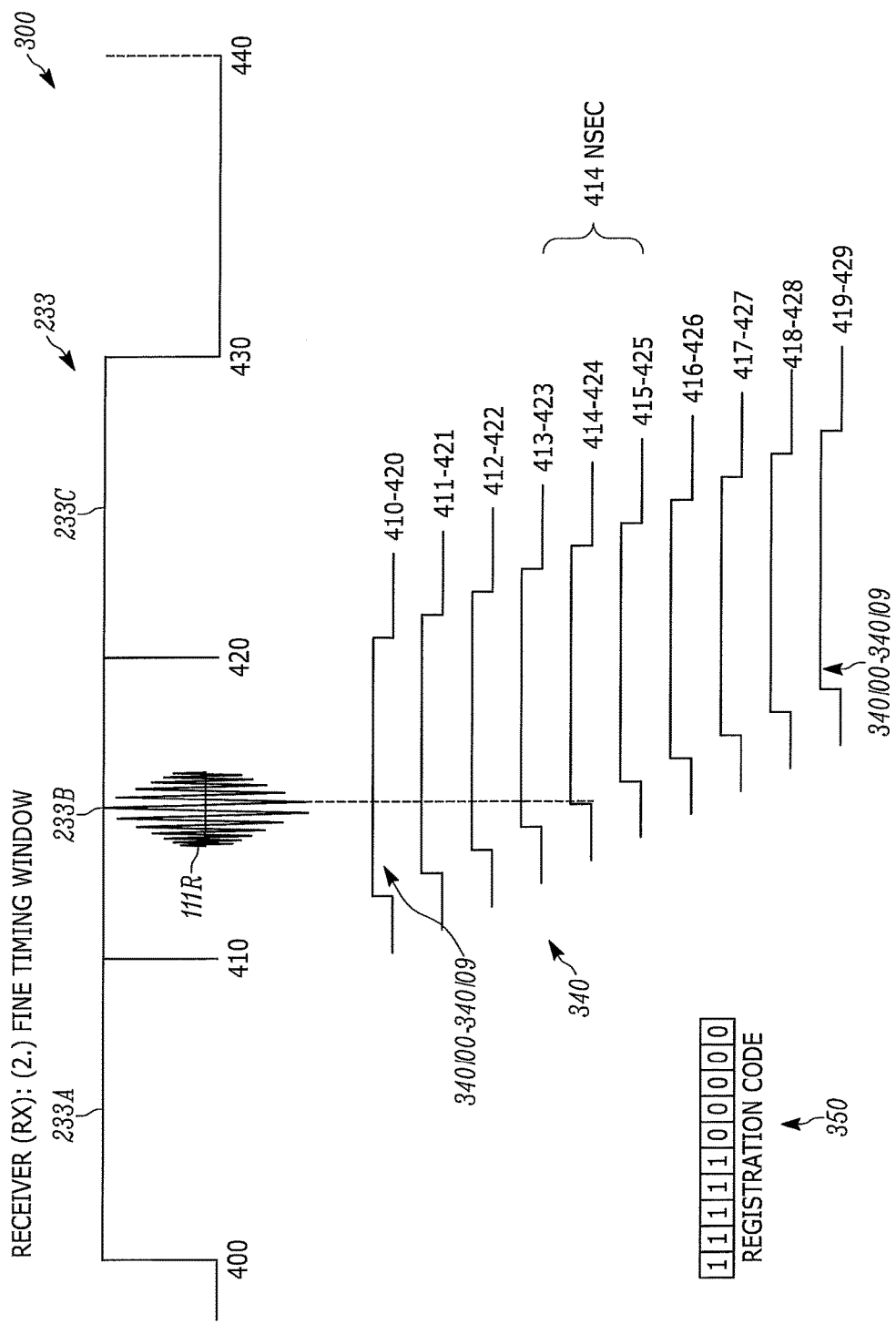
FIG. 3 is an example timing diagram for a receiver (RX) fine timing window function.

FIG. 3 depicts an example timing diagram for a receiver (RX) fine timing window function 300. FIG. 3 comprises the final detection window 233 and the three (3), ten (10) nsec disjoint timing windows 233a-c associated with the final detection window 233, and a parallel set of fine detection windows 340. The final detection window 233 and the fine detection windows 340 are synchronized with the RX clock timing diagram 2022. The leading edge of a first fine detection window 340/00 is synchronous with the leading edge of the final center disjoint timing window 233b associated with the final detection window 233. The RX fine timing window function 300 comprises registering a series of detections in the parallel set of fine detection windows 340, each associated with the final center disjoint timing window 233b. The series of detections in the parallel set of fine detection windows 340 provides for a detection record of the sync code 112, the sequence of 1's and 0's TX pulses 111T transmitted by the RTLS tag transmitter.

The registering the series of detections in the parallel set of fine detection windows 340, each associated with the final center disjoint timing window 233B, comprises a generation of the registration code 350 which codifies the detections of the RX pluses 111R associated with the sync code 112 TX pulses 111T. The registration code 350 codifies the detections with respect to each of the fine detection windows 340/00-340/09 that comprise the set of fine detection windows 340, as shown in the example given in FIG. 3. As demonstrated for the example illustrated in FIG. 3, each successive fine detection window 340/00-340/09 overlaps the previous fine detection window 340/00-340/09 by one (1) nsec, and each of the fine detection windows 340/00-340/09 in the parallel set of fine detection windows 340 is ten (10) nsec wide.

As represented by the registration code 350 for the example illustrated in FIG. 3, a detection of the RX pulse 111R associated with the corresponding sync code 112 TX pulse 111T is registered in the fine detection windows 340/00-440/04, but no detection is registered in the fine detection windows 340/05-340/09. As such, it is inferred, in such instances, that the TOA for the RX pulse 111R is four-hundred fourteen (414) nsec after the leading edge of the RX clock 201.

Example Real Time Locating System

Figure 4:
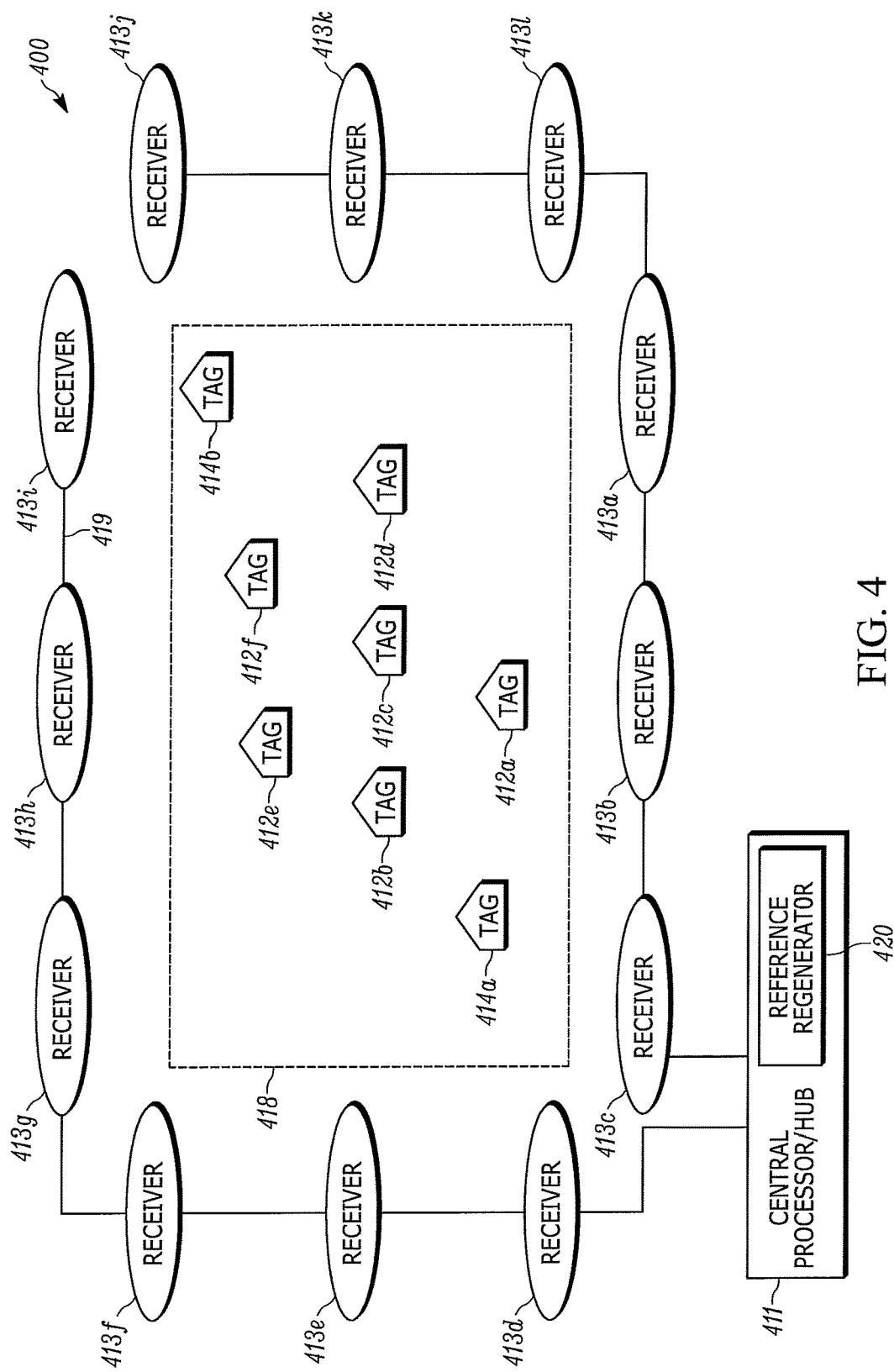
FIG. 4 depicts an example environment using a radio frequency locating system.

FIG. 4 depicts an example environment using a radio frequency locating system 400, in which teachings of this disclosure may be implemented. In particular, the locating system 400 of FIG. 4 calculates a location of an object carrying RTLS tags. The location calculation is accomplished by an accumulation of time of arrival (TOA) information associated with the object, at a central processor/hub 411. In the example locating system 400 of FIG. 4, the TOAs represent a relative time of flight (TOF) from RTLS tags 412a-f as recorded at one or more of a plurality receivers 413a-1 (e.g., UWB reader, etc.). A timing reference clock is used, in some examples, such that at least a subset of the receivers 413a-1 may be synchronized in frequency, whereby the relative TOA data associated with each of the RTLS tags 412a-f may be registered by a counter associated with at least a subset of the receivers 413a-1. In some examples, one or more reference tags 414a-b (e.g., UWB transmitters), positioned at known coordinates, are used to determine a phase offset between the counters associated with at least a subset of the of the receivers 413a-1. In the example of FIG. 4, the RTLS tags 412a-f and the reference tags 414a-b reside in an active RTLS field 418. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 413a-1.

In some examples, the locating system 400 comprising at least the RTLS tags 412a-f and the receivers 413a-1 is configured to provide two dimensional and/or three-dimensional precision localization (e.g., subfoot resolutions), even in the presence of multipath interference, due in part to the use of short nanosecond duration pulses whose TOF can be accurately determined using detection circuitry, such as in the receivers 413a-1. In some examples, the receivers 413a-1 trigger on the leading edge of a received waveform. In some examples, the short pulse characteristic allows data to be conveyed by the locating system 400 at a higher peak power, but lower average power levels, than a wireless system configured for high data rate communications, yet still operate within local regulatory requirements.

In some examples, to provide a desirable performance level while complying with overlap of regulatory restrictions (e.g., FCC and ETSI regulations), the RTLS tags 412a-f may operate with an instantaneous −3 dB bandwidth of approximately four-hundred (400) MHz and an average transmission below one-hundred eighty-seven (187) pulses in a one (1_ msec interval, provided that the rate is sufficiently low. In such examples, the predicted maximum range of the system, operating with a center frequency of 6.55 GHz, is roughly two-hundred (200) meters in instances in which a twelve (12) dbi directional antenna is used at the receiver, but the projected range will depend, in other examples, on receiver antenna gain. Alternatively or additionally, the range of the system allows for the RTLS tags 412a-f to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In some examples, tag transmissions with a −3 dB bandwidth of approximately four-hundred (400) MHz yields, in some examples, an instantaneous pulse width of roughly two (2) nanoseconds that enables a location resolution to better than thirty (30) centimeters (cm).

In the example of FIG. 4, an object to be located carries one or more of the RTLS tags 412a-f (e.g., tag(s) each having a UWB transmitter). The objects to be located carry the RTLS tag(s) 412a-f via, for example, an attachment of the RTLS tag(s) 412a-f to the object, adhering the RTLS tag(s) 412a-f to the object, inserting the RTLS tag(s) 412a-f into an article associated with the object such as clothing or shoulder pads and/or any other suitable manner of carrying. In the example of FIG. 1, the RTLS tags(s) 412a-f transmit a burst pattern (e.g., multiple pulses at a one (1) megabits per second (Mb/s) burst rate, such as one-hundred twelve (112) bits of On-OFF keying (OOK) at a rate of one (1) Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each of the RTLS tags 412a-f may be advantageously provided in order to permit, at the central processor/hub 411, correlation of TOA measurement data from different ones of the receivers 413a-1.

In some examples, one or more of the RTLS tags 412a-f employs UWB waveforms (e.g., low data rate waveforms) to achieve fine resolution because of short pulse (i.e., sub-nanosecond to nanosecond, such as a two (2) nsec (one (1) ns up and one (1) ns down)) durations of UWB waveforms. As such, the information packet may be of a short length (e.g. one-hundred twelve (112) bits of OOK at a rate of one (1) Mb/sec, in some examples), that advantageously enables a higher packet rate. If each information packet is unique, a higher packet rate results in a higher data rate. If each information packet is transmitted repeatedly, the higher packet rate results in a higher packet repetition rate. In some examples, higher packet rate repetition rate (e.g., twelve (12) Hz) and/or higher data rates (e.g., one (1) Mb/sec, two (2) Mb/sec or the like) for each tag may result in larger datasets for filtering to achieve a more accurate location estimate. Alternatively or additionally, in some examples, the shorter length of the information packets, in conjunction with other packet rate, data rates and other system functionality, may result in a longer battery life (e.g., seven (7) years battery life at a transmission rate of one (1) Hz with a three-hundred (300) milliamp-hour (mAh) cell). An alternate implementation may be a generic compact, three (3) volt coin cell, series no. CR2032, with a battery charge rating of two-hundred twenty (220) mAhr, whereby the latter generic coin cell, as can be appreciated, may provide for a shorter battery life.

In some examples, one or more (e.g., four) other tags, such as the reference tags 414a-b, are positioned within and/or about a monitored region such as the active RTLS field 418. In some examples, the reference tags 414a-b are each configured to transmit a signal that is used to measure the relative phase (e.g., the count of free-running counters) of non-resettable counters implemented by the receivers 413a-1.

In some examples, the receivers 413a-1 are connected in a "daisy chain" 419 fashion to advantageously allow for a large number of the receivers 413a-1 to be interconnected over a significant monitored region 118 to reduce and simplify cabling, reduce latency, provide power, and/or the like. In some embodiments, the "daisy chain" 419 is configured to provide bi-directional communications between the receivers 413a-1 and the central processor/hub 411. For example, the receiver 413b is able to send and receive data to the receiver 413c and 413a. This allows each of the receivers 413a-1 to send and receive communications with the central processor/hub 411. The "daisy chain" 419 may act as a wireline link between the receivers 413a-1 and the central processor/hub 411.

In accordance with and embodiment, the central processor/hub 411 includes a reference regenerator 420. The reference regenerator 420, discussed in conjunction in FIG. 7, receives data via the daisy chain 419, and is configured to determine revised reference measurements and reference phase offsets for use in determining a physical location of an RFID tag.

In the illustrated example of FIG. 4, each of the receivers 413a-1 includes a receiver for receiving transmissions, such as UWB transmissions, and preferably, a packet decoding circuit that extracts a TOA timing pulse train, transmitter ID, packet number, and/or other information that may have been encoded in the tag transmission signal (e.g., material description, personnel information, etc.) and is configured to sense signals transmitted by the RTLS tags 412a-f and one or more of the reference tags 414a-b.

In the illustrated example of FIG. 4, each of the receivers 413a-1 includes a time measuring circuit that measures times of arrival (TOA) of tag bursts, with respect to a respective internal counter. The time measuring circuit is phase-locked (e.g., phase differences do not change and therefore respective frequencies are identical) with a common digital reference clock signal distributed via cable connection from the central processor/hub 411 having a central timing reference clock generator. The reference clock signal establishes a common timing reference for the receivers 413a-1. Thus, multiple time measuring circuits of the respective receivers 413a-1 are synchronized in frequency, but not necessarily in phase. While there typically may be a phase offset between any given pair of receivers in the receivers 413a-1, the offset may be determined through use of one or more of the reference tags 414a-b. Alternatively or additionally, each receiver 413a-1 may be synchronized wirelessly via virtual synchronization without a dedicated physical timing channel. As described in detail below in connection with FIGS. 7-10, example methods and apparatus disclosed herein enable re-determination or regeneration of the phase offsets between pairs of the receivers without use of the reference tags 414a-b (e.g., when the need to so do arises at a time during which undesirable conditions exist).

In some example embodiments, the receivers 413a-1 are configured to determine attributes of the received signal. In the example of FIG. 4, as measurements are determined at each receiver 413a-1, in a digital format, rather than analog, signals are transmittable to the central processor/hub 411. Advantageously, because packet data and measurement results can be transferred at high speeds to a receiver memory, the receivers 413a-1 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 413a-1 to the central processor/hub 411 (e.g., the data cables may enable a transfer speed of two (2) Mbps). In some examples, measurement data is transferred to the central processor/hub 411 at regular polling intervals.

In the illustrated example, the central processor/hub 411 determines or otherwise computes a tag location (i.e., object location) by processing TOA measurements relative to multiple data packets detected by the receivers 413a-1. In some examples, the central processor/hub 411 is configured to resolve the coordinates of the RTLS tags 412a-f using nonlinear optimization techniques.

In some examples, TOA measurements from multiple receivers 413a-1 are processed by the central processor/hub 411 to determine a location of a tag 412a-f by a DTOA analysis of the multiple TOAs. The DTOA analysis includes a determination of tag transmit time to, whereby a time-of-flight (TOF), measured as the time elapsed from the estimated tag transmit time to to the respective TOA, represents graphically the radii of spheres centered at respective receivers 413a-1. The distance between the surfaces of the respective spheres to the estimated location coordinates $(x_0, y_0, z_0)$ of the transmit RTLS tag 412a-f represents the measurement error for each respective TOA, and the minimization of the sum of the squares of the TOA measurement errors from each receiver participating in the DTOA location estimate provides for the location coordinates $(x_0, y_0, z_0)$ of the transmit tag 412a-f and of that tag's transmit time to.

In some examples, the system described herein may be referred to as an "over-specified" or "over-determined" system. As such, the central processor/hub 411 may then calculate one or more valid (i.e., most correct) locations based on a set of measurements and/or one or more incorrect (i.e., less correct) locations. For example, a location may be calculated that is impossible due the laws of physics or may be an outlier when compared to other locations. As such one or more algorithms or heuristics may be applied to minimize such error. The starting point for the minimization may be obtained by first doing an area search on a coarse grid of x, y and z over an area defined by the user and followed by a localized steepest descent search. The starting location for this algorithm is fixed, in some examples, at the mean position of all active receivers. In some examples, no initial area search is needed, and optimization proceeds through the use of a Davidon-Fletcher-Powell (DFP) quasi-Newton algorithm. In other examples, a steepest descent algorithm may be used. In each case, the algorithms may be seeded with an initial location estimate (x, y, z) that represents the two-dimensional (2D) or three-dimensional (3D) mean of the positions of the receivers 413a-1 that participate in the tag location determination.

One example algorithm for error minimization, which may be referred to as a time error minimization algorithm, is described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

Where N is the number of receivers, c is the speed of light, $(X_j, y_j, Z_j)$ are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

In some examples, the locating system 400 comprises a receiver grid, whereby each of the receivers 413a-1 in the receiver grid keeps a receiver clock that is synchronized, with an initially unknown phase offset, to the other receiver clocks. The phase offset between any receivers may be determined by use of the reference tag 414a-b that is positioned at a known coordinate position $(x_T, y_T, z_T)$. The phase offset serves to resolve the constant offset between counters within the receivers 413a-1, as described below.

In some examples, a number N of receivers 413a-1 {Rj: j=1, ..., N} are positioned at known coordinates $(x_{R_j}, y_{R_j}, z_{R_j})$, which are respectively located at distances $d_{R_j}$ from a reference tag 414a-b, such as given in Equation 2:

$$d_{R_j} = \sqrt{(x_{R_j}-x_T)^2 + (y_{R_j}-y_T)^2 + (z_{R_j}-z_T)^2} \quad (2)$$

Each receiver Rj utilizes, for example, a synchronous clock signal derived from a common frequency time base, such as clock generator. Because the receivers 413a-1 are not synchronously reset, an unknown, but constant offset Oj exits for each receiver's internal free running counter. The value of the offset Oj is measured in terms of the number of fine resolution count increments (e.g., a number of nanoseconds for a one nanosecond resolution system).

The reference tags 414a-b are used, in some examples, to calibrate the radio frequency locating system (e.g., by generating or establishing values for an initial reference phase offset table) as follows: One of the reference tags 414a-b emits a signal burst at an unknown time $\tau_R$. Upon receiving the signal burst from the reference tag 414a-b, a count $N_{R_j}$ as measured at receiver $R_j$ is given in Equation 3 by:

$$N_{R_j} = \beta\tau_R + O_j + \beta d_{R_j}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta\tau_i + O_j + \beta d_{ij}/c \quad (4)$$

At receiver Rj where $d_{ij}$ is the distance between the object tag $T_i$ and the receiver 413a-1 at receiver $R_j$. Note that $\tau_i$ is unknown, but has the same constant value for all of the receivers 413a-1. Based on the equalities expressed above for receivers $R_j$ and $R_k$ and given the reference tag 414a-b information, differential offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j}-d_{R_k}$ remains constant, (which means the receivers 413a-1 and reference tag 414a-b are fixed and there is no multipath situation) and $\beta$ is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the phase offsets between receivers $R_j$ and $R_k$ may be readily determined based on the reference tag 414a-b transmissions. Thus, again from the above equations, for a tag 412a-f $(T_i)$ transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

or, $$d_{i_j}-d_{i_k}=(c/\beta)[N_{i_j}-N_{i_k}-\Delta_{jk}] \quad (6b)$$

The minimization, described in Equation 1, may then be performed over variables (x, y, z, $t_0$) to reach a solution (x', y', z', $t_0$').

Example Receiver Architecture

Figure 5:
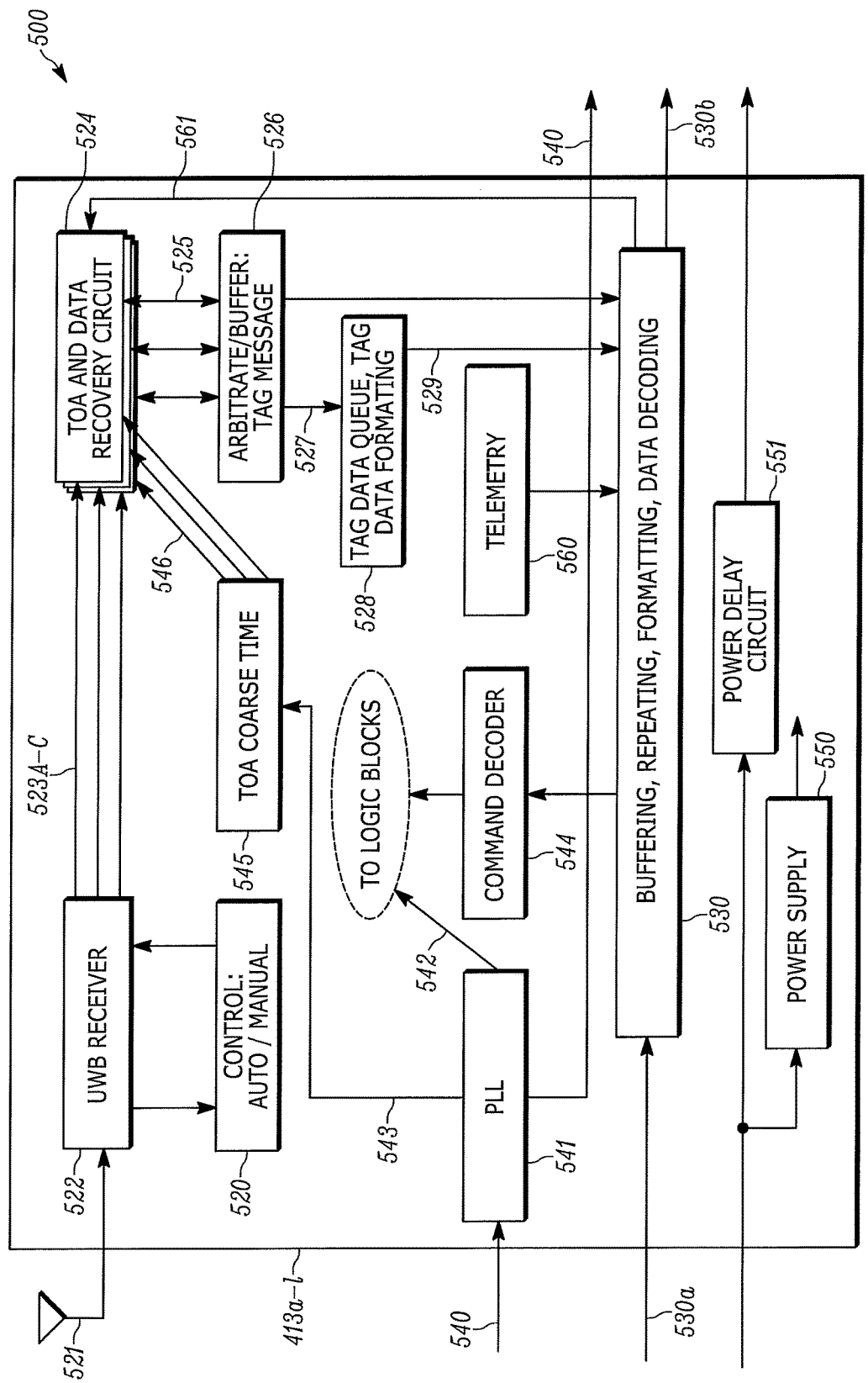
FIG. 5 is a block diagram representative of an example receiver constructed in accordance with teachings of this disclosure.

FIG. 5 depicts an example receiver 413 implemented in, for example, the locating system of FIG. 4. In the example of FIG. 5, over-the-air data packets, such as the data packet 120 of FIG. 1, are transmitted to the receiver 413 and intercepted by a UWB antenna 521 of the receiver 413.

The example receiver 413 of FIG. 5 includes a UWB receiver 522 to process an analog signal stream that is digitized and provided to one or more UWB TOA and data recovery circuits 524. The analog stream is digitized by up to three or more parallel, concurrent, independent analog-to-digital convertors (ADCs) functioning with three distinct threshold levels, resulting in up to three or more digital data streams 523A-C that are sent to the UWB TOA and data recovery circuits 524. In some embodiments, the threshold levels applied to the analog signal stream in the UWB receiver 522 are a function of a signal-to-noise ratio (SNR) present in the communication channel. In some embodiments, the threshold levels are set dynamically as a function of one or more of an antenna preamp gain and an estimated RTLS tag range.

The UWB TOA and data recovery circuits 524 perform as many as three or more parallel, concurrent, identical signal processing functions on the three or more digital data streams 523A-C. The three or more UWB TOA and data recovery circuits 524 may be configured to receive data packets 120 that correspond to RTLS tags 412a-f and reference tags 414a-b. The UWB TOA and data recovery circuits 524 may provide for a packet framing and extraction function as part of the data recovery circuit, whereby an RTLS tag 412a-f identification may be extracted. The RTLS identification may be extracted by the TX identification field 120B of the data packet 120. In some embodiments, the UWB TOA and data recovery circuits 524 are implemented by field programmable gate arrays (FPGAs).

In some examples, the UWB TOA and data recovery circuits 524 process up to three or more parallel, concurrent, identical data packets 120 from RTLS tags 412a-f. The data packet framing and extraction function, and the UWB TOA calculation function may each provide for a registration of each signal received at the UWB receiver 522 with an indexed TOA and corresponding RTLS tag identification, the corresponding UWB TOA and data recovery circuits 524 and the corresponding extracted data packet 120. The index data is sent by TOA line 525 to an arbitrate/buffer function 526.

The arbitrate/buffer function 526 effectively selects the TOA line 525 data provided by the UWB TOA and data recovery circuits 524. The arbitrate/buffer function 526 selects the TOA line 525 that converges to the earliest TOA from the up to three or more TOA and data recovery circuits 524 driven by the digital data stream 523A-C. The arbitrate/buffer function 526 provides for a series of serial messages 527 to send to a tag queue function 528, whereby each of the serial messages 527 is identified by an identifier associated with a corresponding RTLS tag 412a-f and an associated TOA.

The tag queue function 528 provides for a formatting and ordering the collection of RTLS tag identifiers and TOAs, effectively a first-in first-out (FIFO) memory buffer awaiting a transmission to the central processor/hub 411. Upon the tag queue function 528 trigger, a tag data packet 529 is sent to a formatting and data coding/decoding function 530 that, in turn, repackages the tag data packet 529 and transmits a synchronous tag data packet via a transmission line 530B to the central processor/hub 411.

The synchronous tag data packet 530B transmitted by the formatting and data coding/decoding function 530 to the central processor/hub 411 is synchronized by a ten (10) MHz receiver clock 540, received from the previous receiver clock in the "daisy chain" 419, and transmitted to the next receiver clock in the "daisy chain" 419 following a synchronous frequency up/down convert. The receiver clock 540 drives a phase-locked loop (PLL) 541, whereby a frequency divider in a feedback loop in conjunction with a voltage-controlled oscillator (VCO) provides for a one-hundred (100) MHz receiver clock 542 that is synchronized in phase to the ten (10) MHz receiver clock 540. The one-hundred (100) MHz receiver clock 542 is provided to synchronize all logic blocks in the UWB receiver 413. The one-hundred (100) MHz receiver clock 542 also provides for the parallel set of fine detection windows 340, a basis of a set of receiver timing windows used to capture and register pulses transmitted by RTLS tags 412a-f in the TOA determination, as described previously with respect to FIG. 3.

A second function of the formatting and data coding/decoding function 530 is a buffering, reformatting, and repeating of a central processor data received and transmitted between the receiver 413 and the central processor/hub 411 via the transmission lines 530a-b, which may be part of the "daisy chain" 419 receiver network acting as the wireline link between the receivers 413 and the central processor/hub 411. The data coding/decoding function 530 may provide for a series of commands to be transmitted via the transmission lines 530a-b and are decoded at a command decoder 544 to trigger receiver functions. A non-exhaustive list of such functions may include the following: an auto/manual control function 520, a series of telemetry functions 560, and the arbitrate/buffer function 526 to prune a data queue and to manage, delete, and reorder the data queue. The auto/manual control function 520 may be commanded (e.g., from manual mode) to report sensor information such as temperature and/or other telemetry data recorded in the telemetry function 560, and may be commanded to manually adjust one or more of an antenna preamp gain and the previously described threshold levels at the UWB receiver 522.

A power supply 550 may be configured to power the receiver 413 by way of an AC-DC convertor, whereby the AC power may be provided as an input from the central processor/hub 411. The power supply 550 may be accompanied, in some embodiments, by a power delay circuit 551 to allow for an orderly 'power up' of sequential receivers 413a-1, thus avoiding a power surge and over-current event in the central processor data transmission lines 530A-B.

In some examples, the UWB receiver 413 transfers packet data and measurement results at high speeds to TOA measurement buffers, and to the arbitrate/buffer function 526, such that the receivers 413a-1 can receive and process tag 412a-f (and corresponding object) locating signals on a nearly continuous basis. That is, multiple UWB data packets 120 can be processed in close succession, thereby allowing the use of hundreds to thousands of tag transmitters.

In some embodiments, data stored in TOA measurement buffers, the arbitrate/buffer function 526, is sent to the central processor/hub 411 over the central processor data transmission lines 530a-b in response to a specific request from the central processor/hub 411.

In some embodiments, the collection of the central processor data transmission lines 530A-B, connecting a "daisy chain" 419 network of receivers, is comprised of two bi-directional data links In some embodiments, these data links may be RS422 differential serial links. A network interface may receive command signals from the central processor/hub 411 on one link, for example, to instruct a transfer of the TOA measurement buffer, the arbitrate/buffer function 526, to the central processor/hub 411. Additional commands may include those to adjust UWB receiver 522 operating characteristics such as gain and detection thresholds. The bi-directional data links may also provide for buffer for data signals linked between "daisy chain" 419 receivers, buffering sequential transmissions between the present and next receiver 413a-1 in a communications chain.

The central processor data transmission lines 530a-b may also provide a means of distributing a synchronization signal from the central processor/hub 411 to the individual receivers 413a-1 and reporting coarse synchronization signal TOA counter values from the receivers 413a-1 to the central processor/hub 411. The synchronization signal may be a command packet or any packet of information identifiable by the receivers 413a-1 as a synchronization signal. Alternative methods of distributing a synchronization signal may include generating an alteration in the clock signal itself that is distributed via a connection 540. Such an alteration may include a phase inversion, an added transition, or the like. The example receiver 413 of FIG. 5 may further be programmed to determine a TOA of the synchronization signal, via the use of a synchronization detection circuit to identify the synchronization command signal or to identify the clock signal alterations, and responsively trigger capturing the coarse counter clock value. The example receiver 413 of FIG. 5 may further be programmed to prepare a synchronization-signal-response packet that comprises a receiver identity and the TOA of the synchronization signal for transmission via the central processor data transmission lines 530A-B. In some embodiments, the buffering, repeating, formatting, and data decoding function 530 repeats the synchronization signal to an adjacent receiver 413a-1 at a constant delay, independent of other information queued for transmission by the tag data queue, tag data formatting function 528. Thus, the synchronization signal is repeated to the next receiver at a constant delay dependent on the repeatable and consistent synchronization signal processing and wireline transmission delays. The arbitrate/buffer function 26 may be used to prioritize the repeating of the synchronization signal. Because the synchronization signal is repeated between receivers with a constant delay, reference measurements are able to be regenerated after the transmission of a second synchronization signal.

Determining the synchronization signal TOA may be performed similar to determination of the TOA of over-the-air data packets received via the antenna 521 and the UWB receiver 522. However, the synchronization signal is transmitted via the central processor data transmission lines 530a-b rather than over the air, and the buffering, repeating, formatting, and data decoding function 530 transmits detection of the synchronization signal to the TOA and data recovery circuits 524 via a communication link 561 rather than the antenna 521 and the UWB receiver 522. Additionally, the synchronization signal TOA, operating at the lower clock speed of the ten (10) MHz receiver clock 540, comprises only the TOA coarse time 546 and does not need the TOA fine time component depicted in FIG. 6 as the synchronization signal arrives on the 'daisy chain' 419 operating at a frequency corresponding to the coarse time.

The synchronous frequency up/down convert performed of the ten (10) MHz receiver clock 540 provides for a driver for the receiver clock 540 transmitted to the next receiver 413a-1 in the "daisy chain" 419. An advantage of this approach, in some examples, is that the ten (10) MHz receiver clock 540 transmitted to the next receiver, as with the original ten (10) MHz receiver clock 540, may be made low enough in frequency so that it can be transmitted over low-cost cables (e.g., twisted pair wires). As timing jitter of the local timing reference signal degrades as the PLL multiplier coefficient is increased, there is a necessary trade-off between frequency and jitter of the local timing reference signal and the frequency of the timing reference clock.

Utilizing a ten (10) MHz receiver clock 540 for timing reference, a plurality of local timing reference signals (one in each receiver) can be precisely matched in frequency. Using this approach, additional receivers can be connected without concern for clock loading. Buffer delay is also not an issue since the timing reference clock is used for frequency only, and not phase reference.

In some examples, the ten (10) MHz receiver clock 540 includes differential signals. The use of differential clock signals is advantageous because the differential clock signals avoid clock duty cycle distortion that can occur with the transmission of relatively high-speed clocks (e.g., greater than ten (10) MHz) on long cables (e.g., greater than one-hundred (100) feet).

Figure 6:
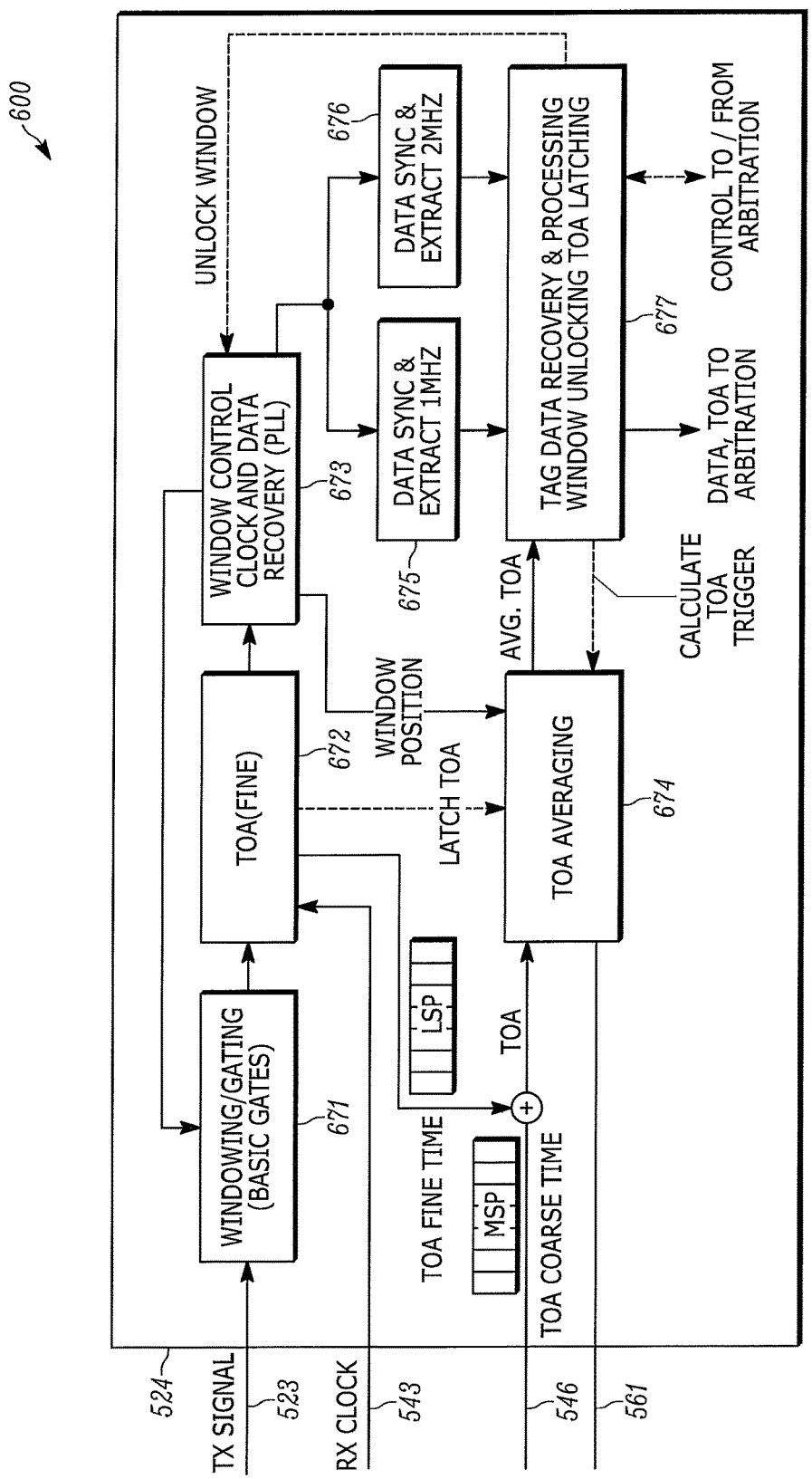
FIG. 6 is a block diagram representative of an example implementation of the ultra-wideband (UWB) TOA and data recovery circuits of FIG. 5.

FIG. 6 depicts an example implementation 600 of the UWB TOA and data recovery circuits 524 of FIG. 5. In the example of FIG. 6, the UWB TOA data and TOA and data recovery circuits 524 comprise a windowing/gating function 671, a TOA function 672, a window control clock and data recovery (PLL) function 673, a TOA averaging function 674, a data sync and extract function (1 MHz-2 MHz) 675-676, and a tag data recovery and processing function 677. The UWB TOA and data recovery circuits 524 process the digital data stream 523 to provide an unpacked data packet and the TOA associated with the RTLS tag to the arbitrate/buffer function 526.

The windowing/gating function 671 and the window control clock and data recovery PLL function 673 work as a feedback loop to recover the TX clock 101 and provide for the adjustable coarse timing window function 200 (FIG. 2). The TOA function 672 works in conjunction with the one-hundred (100) MHz receiver clock 542. The RX clock 201 (542) provides for a TOA coarse time associated with the adjustable coarse timing window function 200 by registering detections for the RX pulses 111R that comprise the RX pulse train 211R corresponding to the TX pulses 111T in the series of TX pulses 111 in the preamble 110. The parallel set of fine detection windows 340 (542) provides for a TOA fine time associated with the fine timing window function 300 (FIG. 3) by recording detections by a registration code 350 for the RX pulses 111R that comprise the sync code 112 TX pulses 111T. The description for the adjustable coarse windowing function 200 and the fine timing window function 300 are given previously in connection with FIGS. 2-3, respectively.

The TOA fine time, the registration code 350, and the final coarse detection window (46), as determined by the adjustable coarse timing window function 200, are sent to the TOA averaging function 674, along with a latch TOA control signal indicating the end of a TOA determination. The TOA averaging function 674 is activated by a calculate TOA trigger, and the averaged TOA is then sent to the tag data recovery and processing function 677.

The data sync and extract function (1 MHz-2 MHz) 75-76, is triggered upon phase lock of the PLL associated with the window control clock and data recovery (PLL) function 673. Upon data synchronization, the data packets 120 are extracted and unpacked at rate of one of one (1) MHz and two (2) MHz, and sent to the tag data recovery and processing function 677. The tag data recovery and processing function 677 serves as a communications control function associated with the arbitrate/buffer function 526 (FIG. 5). The tag data recovery and processing function 677 also serves as a controller for the timing of a locking/unlocking of the window/gating function and PLL 673 and a triggering of the TOA averaging function 674.

Example Reference Regeneration Systems and Methods

Figure 7:
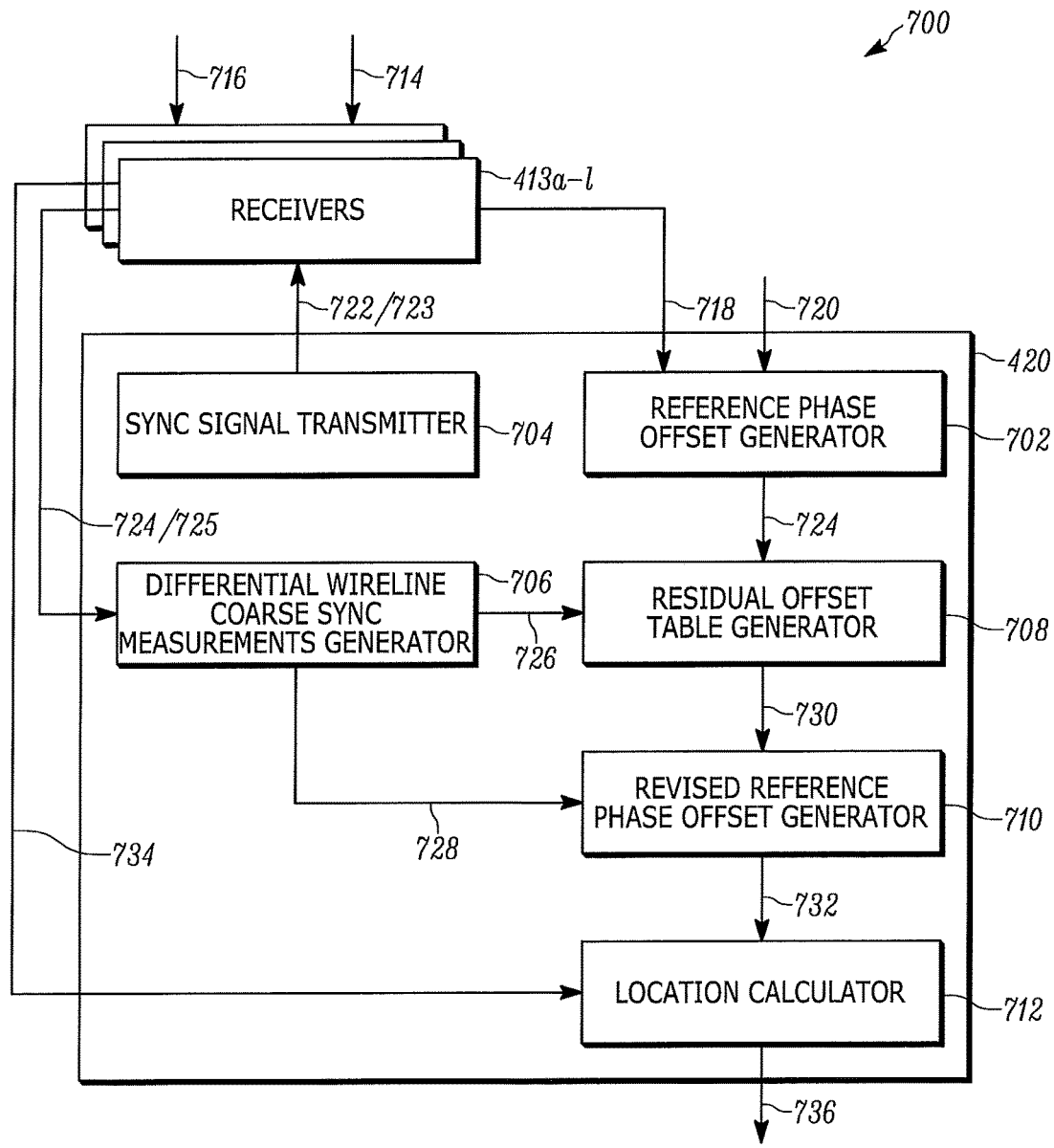
FIG. 7 is a block diagram representative of a reference regenerator constructed in accordance with teachings of this disclosure.

A RTLS can determine the location of an RTLS (e.g.; RFID) tag based at least in part on i) reference measurements, and thus reference phase offsets between pairs of receivers, obtained in a referencing procedure and ii) the DTOA of over-the-air data from the RTLS tag. However, the reference measurements may become invalid, for example, through a power cycle to a receiver or the RTLS system. Without valid reference measurements, the RTLS system is unable to accurately determine the location of the RTLS tag. Operating constraints may preclude performing a subsequent referencing procedure to obtain new reference measurements. It is desirable to determine and store a residual offset table by transmitting a first synchronization signal via the wireline. The reference phase offsets may be redetermined by subsequently transmitting a second synchronization signal via the wireline, and combining the coarse differential wireline offsets obtained after the second synchronization signal transmission with the stored residual offset table. Thus, it is desirable to redetermine the reference phase offsets via the reference regenerator 420 of the central processor/hub 411 of FIG. 4 to determine the physical location of the RTLS tags with the redetermined reference phase offsets. This avoids reperforming the reference procedure FIG. 7 is block diagram representative of a reference regenerator constructed in accordance with teachings of this disclosure. In particular, FIG. 7 depicts the functional block diagram 700 that includes the reference regenerator 420 and the receivers 413*a*-1. The reference regenerator 420 includes a reference phase offsets generator 702, a synchronization signal transmitter 704, a differential wireline coarse synchronization measurements generator 706, a residual offset table generator 708, a revised reference measurements generator 710, and a location calculator 712.

The receivers 413*a*-1 are configured to receive tag blink data (e.g., ultra-wideband (UWB) transmissions) from one or more RTLS tags. The receivers 413*a*-1 receive the reference tag blink data 714 from the reference tags, such as the reference tags 414*a*-*b*, and receive the RTLS blink data 716 from RTLS tags to be located, such as the tags 412*a*-*f*. The receivers 413*a*-1 transmit reference counter values 718 corresponding to the time reference tag data is received to the reference phase offsets generator 702. The receivers 413*a*-1 transmit locationing counter values 736 corresponding to the time RTLS tag data of tags to be located are received to the location calculator 712.

The reference phase offset generator 702 is configured to determine the reference phase offsets between the receivers 413*a*-1. The reference phase offsets are the difference in the receiver's counter values, that is, a measure of a relative counter value differences between two internal receiver clocks, for each pair of receivers. To determine the reference phase offsets, the reference tags 414*a*-*b* are placed at known positions on a target area. The geolocation information 720 of the known positions of each reference tag 414*a*-*b* and receivers 413*a*-1 is provided to the reference phase offset generator 702. Since the reference tag 414*a*-*b* and receivers 413*a*-1 positions are known, the reference phase offsets can be determined based on propagation time of the tag blink data and the reference measurements (receiver counter values) when the reference tag data is received at each receiver by subtracting the counter values of the different pairs of receivers 413*a*-1. The reference phase offset generator 702 provides the residual offset table generator 708 with a reference phase offset 724. Both the counter values and the reference phase offsets of the over-the-air tag blink data comprise both coarse and fine components.

The synchronization signal transmitter 704 is configured to transmit a first synchronization signal 722 to the receivers 413*a*-1. The synchronization signal 722 is transmitted via a wireline link, such as the "daisy chain" 419. Each receiver 413*a*-1 determines a counter value, comprising a coarse component, when the receiver detects the synchronization signal 722. The receivers 413*a*-1 provide the first synchronization signal arrival counter times 724 to the differential wireline coarse synchronization measurements generator 706.

The differential wireline coarse synchronization measurements generator 706 determines differential wireline coarse synchronization measurements 726 for the pairs of receivers 413*a*-1 by subtracting the counter values 724 for each of the pairs of receivers. the differential wireline coarse synchronization measurements 726 are provided to the residual offset table generator 708.

The residual offset table generator 708 determines and stores a residual offset table 730 by subtracting the differential wireline coarse synchronization measurements 726 from the reference phase offsets 724. Each pair of receivers may have a residual offset value, the residual offset table 730 including data for each pair of receivers. The residual offset table 730 may be stored for future use, either in the reference regenerator 720, within the central processor/hub 411, or the like. The residual offset table is also provided to the revised reference phase offset generator 710.

The synchronization signal transmitter 704 is further configured to transmit a second synchronization signal 723 to the receivers 413a-1. The second synchronization signal 723 is similar to first synchronization signal 722, and is similarly transmitted via the wireline link. The receivers 413a-1 provide the second synchronization signal arrival times 725 to the differential wireline coarse synchronization measurements generator 706. The differential wireline coarse synchronization measurements generator 706 determines revised differential wireline coarse synchronization measurements 728 similar to the differential wireline coarse synchronization measurements 726, except the counter values 725 associated with the second synchronization signal 723 are used instead of the counter values 724 associated with the first synchronization signal 722. The revised differential wireline coarse synchronization measurements 728 are provided to the revised reference phase offset generator 710.

The revised reference phase offset generator 710 is configured to generate revised reference phase offsets 732 by combining the revised differential wireline coarse synchronization offsets 728 with the residual offset table 730. The combination involves determining a sum of the two values (728 and 730). The revised reference phase offsets 732 are transmitted to the location calculator 712.

The location calculator 712 is configured to determine a location of an RTLS tag 736 based on the revised reference phase offsets 732 and the locationing counter values 734. The location of the RTLS tag 736 is output for display on a user interface, determining other location based statistics, and the like.

Figure 8:
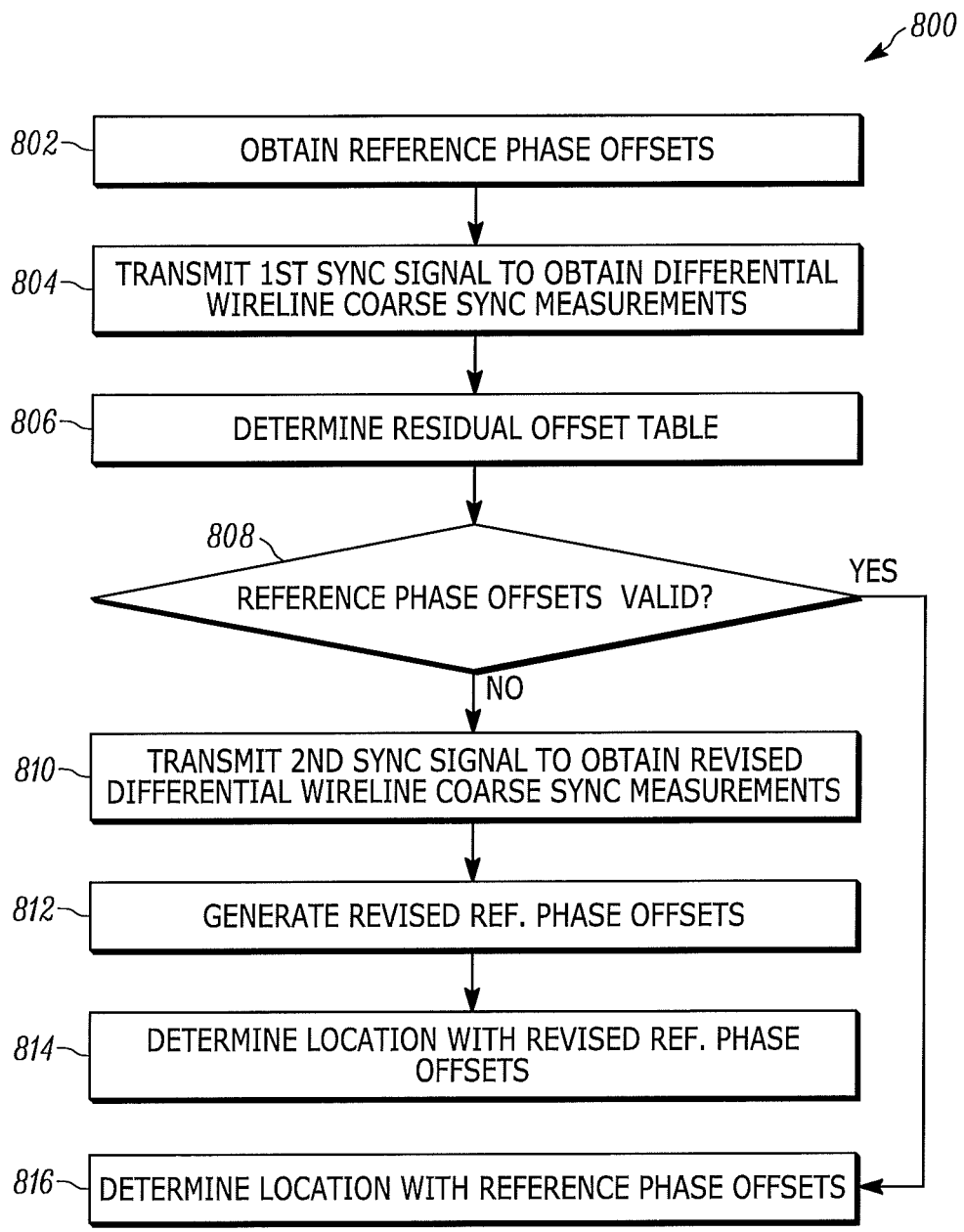
FIG. 8 is a flowchart representative of an example method for reference phase offset regeneration in accordance with teachings of this disclosure.

FIG. 8 is a flowchart representative of an example method for reference phase offset regeneration in accordance with teachings of this disclosure. The example method 800 of FIG. 8 is described below in connection with RTLS system of FIGS. 1-6. However, the example method 800 may be implemented in any suitable environment. The example method 800 includes obtaining reference phase offsets (block 802), transmitting a first synchronization signal (block 804), determining a residual offset table (block 806), determining if the reference phase offsets are valid (block 808), transmitting a second synchronization signal (block 810), generating revised reference phase offsets (block 812), determining a physical location of a radio frequency identification (RFID) tag with the revised reference phase offsets (block 814), and determining a physical location of an RFID tag with reference phase offsets 816. The method 800 may be performed in part by components of the reference regenerator 420 discussed in FIG. 8, as discussed below.

At block 802, the reference phase offset generator 702 obtains reference phase offsets. Each reference phase offset includes a coarse reference component and a fine reference component. The coarse reference component may be an integral number of cycles of a clock derived from a distributed clock signal, such as a nearest one hundred (100) MHz cycle derived from the ten (10) MHz distributed receiver clock 540 of FIG. 5. The fine reference component may be a modulo-reduced difference (the one hundred (100) MHz cycle further divided by ten (10) to achieve a one (1) GHz cycle, and thus a one (1) ns fine counter resolution) of the reference measurement and the coarse reference component. In some embodiments, the frequency of the fine reference component is 1 GHz, or intervals of 1 ns, as discussed in FIGS. 3 and 6.

In some embodiments, the reference measurements are obtained by placing the reference tags 414a-b at known locations on a monitored area, such as the active RTLS field 418 of FIG. 4. Based on an expected time of travel of over-the-air transmitted data from the RTLS tags 412a-f to the receivers 413a-1 at known locations, reference measurements are obtained.

In the illustrated example, the reference measurements obtained at block 702 are used to generate a phase offset table. The phase offset table represents a difference in counter values between pairs of the receivers 413a-1 in the RTLS system. The values of the phase offset table are used to with the TOA counter values of the over-the-air data transmissions received by the receivers 413a-1 to calculate a physical location of the respective tags 412a-f. Notably, the reference phase offset table generated at block 802 is based on reference tag blink data received from the reference tags 414a-b. As such, this initial phase offset table may be referred to as a "blink data-based phase offset table."

At block 804, the synchronization signal transmitter 704 transmits a first synchronization signal 722 via a wireline link to obtain wireline coarse sync measurements. In some examples, the wireline over which the first synchronization signal is transmitted by one or more communication wires or cables that implement the "daisy chain" 419 to the receivers 413a-1. In the illustrated example, the first synchronization signal 722 is transmitted sync signal transmitter 704 within the central processor/hub 411 via central processor data transmission lines 530a-b to the receivers 413a-1. In some examples, the individual receivers 413a-1 receive the first synchronization signal via a corresponding buffering, repeating, formatting, and data decoding function 530, which repeats the first synchronization signal via the central processor data transmission line 530a-b to one or more of the other receivers 413a-1 along the 'daisy chain' 419.

As discussed in conjunction with FIG. 5, a coarse time is determined for the arrival of the first synchronization signal 722 via the wireline link. In the example of FIG. 8 at block 804, differential wireline coarse sync measurements are obtained based on the receivers 413a-1 providing coarse counter values 724 to the differential wireline coarse sync measurements generator 706 corresponding to the determined coarse time of arrival of the synchronization signal 722 via the wireline link. The differential wireline coarse sync measurements 726 are indicative of a constant delay in the propagation of the wireline as the first synchronization signal 722 progresses through each of the receivers 413a-1 along the 'daisy chain' 419. Time stamps (counter values) associated with the wireline coarse sync measurements are provided to the differential wireline coarse sync measurements generator 706, thereby providing timing information indicative of the timing relationships between the receivers 413a-1.

At block 806, the residual offset table generator 708 determines values of the residual offset table based at least in part on the differential wireline coarse sync measurements and the reference phase offset table. In the illustrated example of FIG. 8, the values of the residual offset table 730 represent the difference between the reference phase offsets and the differential wireline coarse sync measurements for different pairs of the receivers 413a-1. In some examples, determining the values of the residual offset table 730 includes subtracting the differential wireline coarse sync measurements from the reference phase offsets obtained at block 802.

At decision block 808, the central processor/hub 411 checks that the reference phase offsets are valid. Invalid reference phase offsets would result in an inaccurate, or indeterminate, location of the RTLS tags. The reference phase offsets may become invalid after a loss of power to the system, causing the receiver's counter values to reset to a different position as determined during a reference procedure. Additionally, the receiver counters may drift over time. The reference phase offset validity check may comprise checking that power has been maintained to the receivers, measuring a set period of time before determining the reference phase offsets are invalid due to system drift, evaluating a determined location, and the like.

If the reference phase offsets are valid at block 808, the location of the RTLS tag may be determined with the reference phase offsets at block 816. At 816, the central processor/hub 411 is able to determine the RTLS tag location based on the reference phase offsets determined during a reference procedure and the TOA of the over-the-air data received at the various receivers 413a-1.

If the reference phase offsets are not valid at block 808, the synchronization signal transmitter 704 transmits a second synchronization signal 723 via the wireline to the receivers 413a-1 to obtain revised differential wireline coarse sync measurements. Each of the receivers 413a-1 provide coarse counter value data 725 corresponding to the determined arrival of the second synchronization signal 723 to the differential wireline coarse sync measurements generator 706 in order to determine the revised differential wireline coarse synchronization measurements 728. The second synchronization signal 723 is transmitted in the same manner as the first synchronization signal 722 (block 804) and similarly the revised differential wireline coarse sync measurements 728 represent the constant delay in the propagation of the wireline, but are based on reset (previously determined invalid at 808) counter values. The revised wireline coarse sync measurements 728 are dependent on the coarse clock values of the corresponding receiver when the second synchronization signal 723 is received at that receiver.

In some examples, the transmission of the second synchronization signal 723 is performed in response to a determination that the current values of the reference phase offset table 724 are invalid. For example, the reference phase offset values 724 may be determined invalid based on unexpected determined locations of the RFID tags 412a-f, a predetermined period of time having elapsed, and/or any other indication of invalid data. Additionally or alternatively, the second synchronization signal 723 may be transmitted in response to a loss of electrical power to at least one of the receivers 413a-1. In such instances, the clocks of the receivers 413a-1 may have different phase offsets than those of the previously generated reference phase offset table 724, and determining a location of the tag 412a-f based on such invalid phase offset values may result in location error or degradation of location accuracy. Thus, transmitting the second synchronization signal 723, and generating revised reference phase offsets 732 is performed to restore accuracy, without the need to obtain new reference tag blink data from the reference tags 414a-b. That is, the process of regenerating the reference phase offsets based on newly acquired reference tag blink data, which is a laborious and, in some conditions, impractical (e.g., when the locating system is implemented at a football stadium and the regeneration is required on day of a game) is made avoidable by way of the example method 800 of FIG. 8, At block 812, the revised reference phase offsets generator 710 generates the revised reference phase offsets 732 by combining (e.g.; addition of the tables) the revised differential wireline coarse sync measurements 728 with the values of the residual offset table 730. The revised reference measurements 732 include both fine and coarse components. Notably, the revised reference phase offsets 732 are generated without having to obtain new reference tag blink data and, thus, the task of regenerating the phase offset values after, for example, a power cycle is reduced to transmission of a synchronization signal via the wireline link and operations based on the corresponding measurements and the residual offset table.

At block 814, a physical location of individual ones of the tags 412a-f is determined based at least in part on i) the revised reference phase offsets 732 and ii) RFID receiver clock measurements 734 corresponding to a TOA of the over-the-air transmitted data from the RTLS tags 412a-f. By using the revised reference phase offsets 732 for the different pairs of the receivers 413a-1, the physical location of the tags 412a-f can be determined despite a loss of synchronization since the time the initial reference measurements are obtained at block 802. In using equations 2-5, the offset value $O_n$ is updated for each one of the receivers 413a-1 with the revised reference measurement determined in block 814.

In yet a further embodiment, an over-the-air synchronization signal may be used to command the receivers to determine an associated clock counter value instead of a transmission of a synchronization signal via the wireline. Note that the so-called "wireline sync" measurements only need to maintain a consistent relative delay between the various receivers with respect to one "wireline" measurement to the next measurement. Because the relative differences from the wireline measurements are combined with the original reference-based measurements to obtain the offset values, as long as the next set of relative differences obtained from subsequent wireline measurements maintain the same relative timing measurements, then the revised reference measurements will be accurate. Thus, note that embodiments using a wireless transmission of a synchronization signal, a location of the originating wireless source need not be known, or otherwise corrected for, as long as it's location is not changed between synchronization measurements.

FIG. 9 depicts an example first reference phase offset table 900. The example reference phase offset table 900 of FIG. 9 includes a list of all receivers across the top row and left column of the table 900. Each box represents the phase difference (counter value difference) between two of the receivers 413a-1. The reference measurements on which the reference phase offsets are based include both coarse and fine components. For example, a phase offset of 732 ns would include the coarse component of 730 ns and a fine component of 2 ns.

Figure 10A:
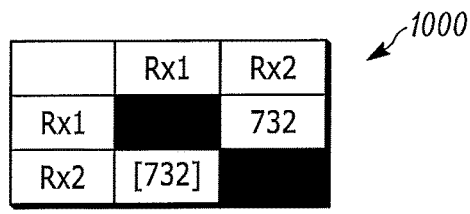
FIG. 10A is a table including example values for second reference measurement offsets.

FIG. 10A depicts a second reference phase offset table 1000. The reference phase offset table 1000 is similar to that of the table 900, but only compares the phase offset of two receivers, Rx1 and Rx2, although certainly any number of receivers could be used. The data stored in the reference phase offset table 1000 of FIG. 10A is based on the reference measurements from the receivers and includes both coarse and fine components and represent the difference between the counter values of Rx1 and Rx2 as determined during a reference procedure. Here, the phase offset between Rx1 and Rx2 is 732 ns, and a negative offset is applied to the phase offset between Rx2 and Rx1. Similar conventions are used in the tables depicted in FIGS. 10B-10E.

Figure 10B:
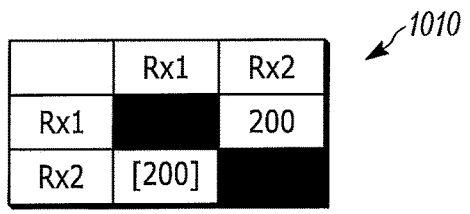
FIG. 10B is a table including example values for differential wireline coarse sync measurements.

FIG. 10B depicts differential wireline coarse sync measurements 1010. The wireline coarse sync measurements 1010 of FIG. 10B are obtained by a first synchronization signal being transmitted via a wireline link. Here, the wireline coarse sync offset measurements between Rx1 and Rx2 is 200 ns, and only includes the coarse component.

Figure 10C:
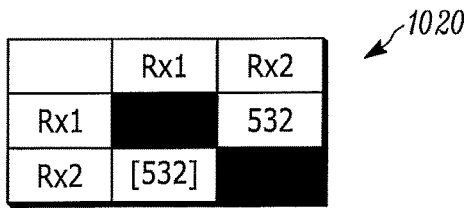
FIG. 10C is a table including example values for residual offsets.

FIG. 10C depicts a residual offset table 1020. The values of the residual offset table 1020 are based at least in part on the differential wireline coarse sync measurements of table 1010 of FIG. 10B and the reference phase offset table 1000 of FIG. 10A. Here, the 200 ns coarse sync measurement is subtracted from the 732 ns reference measurement, resulting in a 532 ns residual offset between the receivers Rx1 and Rx2.

Figure 10D:
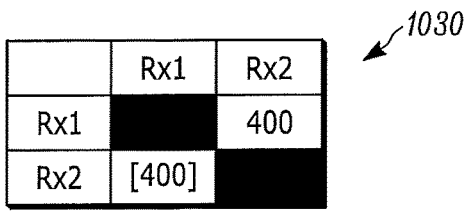
FIG. 10D is a table including example values for revised differential wireline coarse sync measurements.

FIG. 10D depicts revised differential wireline coarse sync measurements 1030. The revised differential wireline coarse sync measurements 1030 are based on a second synchronization signal being transmitted via the wireline link. Here, the revised wireline coarse sync measurement is 400 ns, and only includes a coarse component.

Figure 10E:
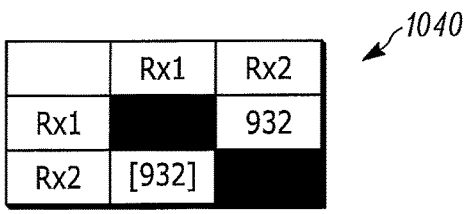
FIG. 10E is a table including example values for revised reference phase offsets.

FIG. 10E depicts a revised reference phase offset table 1040. The revised reference phase offsets are determined by combining (e.g.; adding) values of the revised wireline coarse sync measurements from table 1030 with corresponding values of the residual offset table 1020.

The data stored in the tables depicted in FIGS. 10A-E may be stored in any computer processor, such as the central processor/hub 411. A location of an RTLS tag may be determined based at least in part on the revised reference phase offsets in table 1040 and TOA data based on blink data transmitted from the corresponding RTLS tag.

Figure 11:
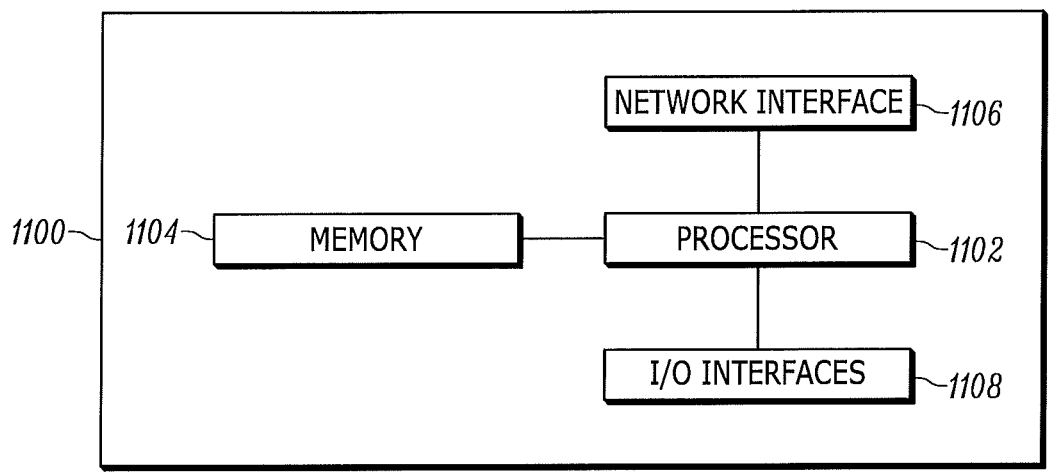
FIG. 11 is a block diagram representative of an example logic circuit capable of implementing example methods and apparatus disclosed herein.

FIG. 11 is a block diagram representative of an example logic circuit capable of implementing, for example, one or more components of the example reference generator of FIG. 7 or, more generally, the example central processor/hub 411 of FIG. 4. The example logic circuit of FIG. 11 is a processing platform 1100 capable of executing instructions to, for example, implement operations of the example methods represented by the flowcharts of the drawings that accompany this description. Other example logic circuits capable of, for example, implementing operations of the example methods represented by the flowcharts of the drawings that accompany this description include field programmable gate arrays (FPGAs) and application specific integrated circuits (ASICs).

The example processing platform 1100 of FIG. 11 includes a processor 1102 such as, for example, one or more microprocessors, controllers, and/or any suitable type of processor. The example processing platform 1100 of FIG. 11 includes memory (e.g., volatile memory, non-volatile memory) 1104 accessible by the processor 1102 (e.g., via a memory controller). The example processor 1102 interacts with the memory 1104 to obtain, for example, machine-readable instructions stored in the memory 1104 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 1100 to provide access to the machine-readable instructions stored thereon.

The example processing platform 1100 of FIG. 11 includes a network interface 1106 to enable communication with other machines via, for example, one or more networks. The example network interface 1606 includes any suitable type of communication interface(s) (e.g., wired and/or wireless interfaces) configured to operate in accordance with any suitable protocol(s).

The example processing platform 1100 of FIG. 11 includes input/output (I/O) interfaces 1108 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

We claim:

1. A method comprising:
obtaining reference phase offsets corresponding to a difference between clock values of a plurality of radio frequency identification (RFID) receivers;
transmitting a first synchronization signal from a central hub to the plurality of RFID receivers via a wireline link;
obtaining differential wireline coarse sync measurements corresponding to a difference between pairs of RFID receiver clock coarse values when each of the plurality of RFID receivers receives the first synchronization signal;
determining a residual offset table based at least in part on the differential wireline coarse sync measurements and the reference phase offsets;
responsive to determining that the reference phase offsets are invalid:
transmitting a second synchronization signal from the central hub to the plurality of RFID receivers via the wireline link; and
obtaining revised differential wireline coarse sync measurements corresponding to a difference between pairs of RFID receiver clock coarse values when each of the RFID receivers receives the second synchronization signal;
generating revised reference phase offsets by combining the revised differential wireline coarse sync measurements with the residual offset table; and
determining a physical location of a RFID tag based at least in part on i) the revised reference phase offsets and ii) RFID receiver clock values corresponding to a time-of-arrival of over-the-air data transmitted from the RFID tag.

2. The method of claim 1, wherein each reference phase offset has a coarse reference component and a fine reference component, and the coarse reference component comprises an integral number of cycles of a receiver clock signal.

3. The method of claim 2, wherein the frequency of the receiver clock signal is 10 MHz.

4. The method of claim 2, wherein the frequency of the fine reference component is 1 GHz.

5. The method of claim 1, wherein determining the residual offset table based at least in part on the differential wireline coarse sync measurements and the reference phase offsets comprises subtracting the differential wireline coarse sync measurements from the reference phase offsets.

6. The method of claim 1, wherein the transmitting of the second synchronization signal is done in response to a loss of electrical power to at least one of the plurality of RFID receivers.

7. The method of claim 1, wherein the obtaining of the reference phase offsets from the plurality of RFID receivers is based reference tags placed on a target area at known reference locations.

8. The method of claim 1, further comprising distributing a clock signal to the plurality of RFID receivers via the wireline link.

9. A location system comprising:
a reference phase offset generator configured to obtain reference phase offsets for a plurality of radio frequency identification (RFID) receivers;
a synchronization signal transmitter to transmit a first synchronization signal from a central hub to the plurality of RFID receivers via a wireline link and, responsive to determining that the reference phase offsets are invalid, to transmit a second synchronization signal from the central hub to the plurality of RFID receivers via the wireline link;
a differential wireline coarse sync measurements generator to:
obtain differential wireline coarse sync measurements corresponding to a difference between pairs of RFID receiver clock coarse values when each of the plurality of RFID receivers receives the first synchronization signal; and
obtain revised differential wireline coarse sync measurements corresponding to a difference between pairs of RFID receiver clock coarse values when each of the RFID receivers receives the second synchronization signal;
a residual offset table generator configured to determine residual offsets based at least in part on the differential wireline coarse sync measurements and the reference phase offsets;
a revised reference phase offset generator configured to generate revised reference phase offsets by combing the revised differential wireline coarse sync measurements with the residual offset table; and
a physical location calculator configured to determine a physical location of an RFID tag based at least in part on i) the revised reference phase offsets and ii) RFID receiver clock values corresponding to a time-of-arrival of over-the-air transmitted data from the RFID tag.

10. The location system of claim 9, wherein each reference phase offset has a coarse reference component and a fine reference component, and the reference measurements generator is configured to obtain the reference measurements based on the coarse reference component comprising an integral number of cycles of a receiver clock signal.

11. The location system of claim 10, wherein the frequency of the receiver clock signal is 10 MHz.

12. The location system of claim 10, wherein the frequency of the fine reference component is 1 GHz.

13. The location system of claim 9, wherein the residual offset table generator is configured to subtract the differential wireline coarse sync measurements from the reference phase offsets to determine the residual offsets.

14. The location system of claim 9, wherein the synchronization signal transmitter is configured to transmit the second synchronization signal responsively to a loss of electrical power to at least one of the plurality of RFID receivers.

15. The location system of claim 9, wherein the reference phase offset generator is configured to obtain the reference phase offsets based on reference tags placed on a target area at known reference locations.

16. The location system of claim 9, wherein a clock signal is distributed to the plurality of RFID receivers via the wireline link.

17. A non-transitory computer readable storage medium including a set of instructions for execution by a processor, the set of instructions, when executed, cause a controller to:
  obtain reference phase offsets corresponding to a difference between clock values of a plurality of radio frequency identification (RFID) receivers;
  transmit a first synchronization signal from a central hub to the plurality of RFID receivers via a wireline link;
  obtain differential wireline coarse sync measurements corresponding to a difference between pairs of RFID receiver clock coarse values when each of the plurality of RFID receivers receives the first synchronization signal;
  determine a residual offset table based at least in part on the differential wireline coarse sync measurements and the reference phase offsets;
  responsive to determining that the reference phase offsets are invalid:
    transmit a second synchronization signal from a central hub to the plurality of RFID receivers via the wireline link; and
    obtain revised differential wireline coarse sync measurements corresponding to a difference between pairs of RFID receiver clock coarse values when each of the plurality of RFID receivers receives the second synchronization signal;
  generate revised reference phase offsets by combining the revised differential wireline coarse sync measurements with the residual offset table; and
  determine a physical location of a RFID tag based at least in part on i) the revised reference phase offsets and ii) RFID receiver clock values corresponding to a time-of-arrival of over-the-air data transmitted from the RFID tag.

18. The non-transitory computer readable storage medium of claim 17, wherein each reference phase offset has a coarse reference component and a fine reference component, and the coarse reference component comprises an integral number of cycles of a receiver clock signal.

19. The non-transitory computer readable storage medium of claim 17, the instructions, when executed, cause the controller to determine the residual offset table by subtracting the differential wireline sync measurements from the reference phase offsets.

20. The non-transitory computer readable storage medium of claim 17, the instructions, when executed, cause the controller to distribute a clock signal to the plurality of RFID receivers via the wireline link.

\* \* \* \* \*